US008547417B2

(12) United States Patent
Pan

(10) Patent No.: US 8,547,417 B2
(45) Date of Patent: Oct. 1, 2013

(54) STEREOSCOPIC IMAGING APPARATUS AND STEREOSCOPIC IMAGING METHOD

(75) Inventor: Yi Pan, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 510 days.

(21) Appl. No.: 12/843,406

(22) Filed: Jul. 26, 2010

(65) Prior Publication Data
US 2011/0018972 A1  Jan. 27, 2011

(30) Foreign Application Priority Data
Jul. 27, 2009  (JP) ................................. 2009-174560

(51) Int. Cl.
*H04N 7/18* (2006.01)
(52) U.S. Cl.
USPC ............................................. 348/42; 348/46
(58) Field of Classification Search
USPC ..................................................... 348/42–60
See application file for complete search history.

(56) References Cited

U.S. PATENT DOCUMENTS

| 5,532,782 | A  | * | 7/1996 | Mori et al. ........................ 396/89 |
| 6,512,892 | B1 | * | 1/2003 | Montgomery et al. ........ 396/326 |
| 7,933,512 | B2 | * | 4/2011 | Campbell et al. .............. 396/325 |
| 2011/0001797 | A1 | * | 1/2011 | Cookson et al. ................ 348/47 |

FOREIGN PATENT DOCUMENTS

| JP | 8-194274 A | 7/1996 |
| JP | 2006-162990 A | 6/2006 |

* cited by examiner

*Primary Examiner* — Andy Rao
(74) *Attorney, Agent, or Firm* — Birch, Stewart, Kolasch & Birch, LLP

(57) ABSTRACT

A stereoscopic imaging method using: first and second imaging devices including first and second imaging optical systems with first and second focus lenses and imaging a subject to generate first and second images; and a lens driving device configured to move the first and second focus lenses along the first and second optical axes of the first and second imaging optical systems, respectively, the method includes: moving the focus lenses to detect first and second focus positions in an imaging space of the first and second focus lenses, respectively; calculating a stereoscopic view possible range where a parallax amount of the first and second imaging device is within an acceptable range; determining whether the focus positions are between an intersection of the optical axes and a near point of the stereoscopic view possible range; and causing the lens driving device to focus the first and second focus lens on the determined focus position.

15 Claims, 37 Drawing Sheets

LEFT PHOTOGRAPHIC IMAGE

RIGHT PHOTOGRAPHIC IMAGE

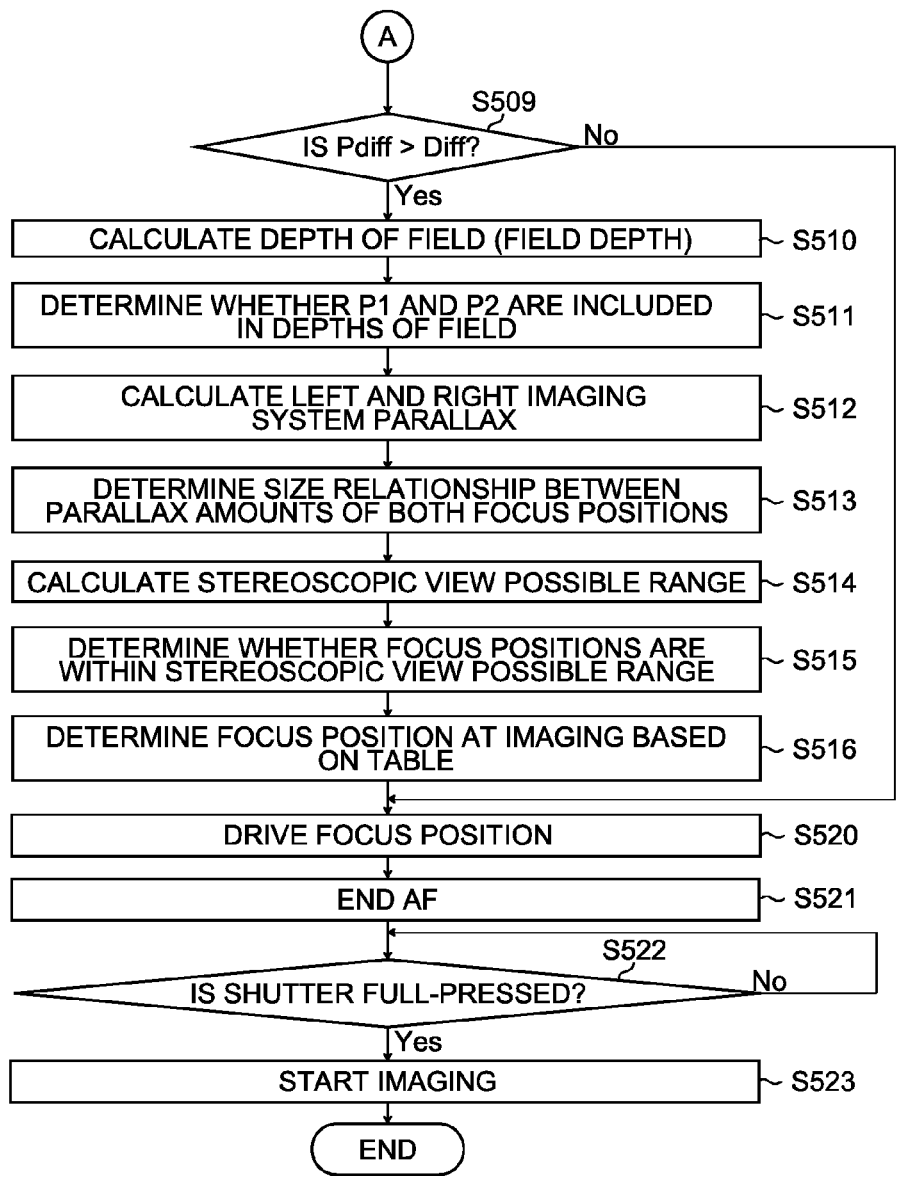

FIG.27

|  | LEFT IMAGING SYSTEM FOCUS POSITION P1 | RIGHT IMAGING SYSTEM FOCUS POSITION P2 | FOCUS POSITION AT IMAGING P3 |
|---|---|---|---|
|  | STEREOSCOPIC VIEW POSSIBLE RANGE IN/OUT DETERMINATION | | |
| CASE1 | WITHIN RANGE | OUT OF RANGE | LEFT IMAGING SYSTEM FOCUS POSITION P1 |
| CASE2 | OUT OF RANGE | WITHIN RANGE | RIGHT IMAGING SYSTEM FOCUS POSITION P2 |
| CASE3 | OUT OF RANGE | OUT OF RANGE | FOCUS POSITION WITH SMALLER PARALLAX |
| CASE4 | WITHIN RANGE | WITHIN RANGE | FOCUS POSITION OF IMAGING SYSTEM INCLUDING LEFT AND RIGHT FOCUS POSITIONS IN DEPTH OF FIELD |

FIG.28

|  | LEFT IMAGING SYSTEM FOCUS POSITION P1 | RIGHT IMAGING SYSTEM FOCUS POSITION P2 | FOCUS POSITION AT IMAGING P3 |
|---|---|---|---|
|  | STEREOSCOPIC VIEW POSSIBLE RANGE IN/OUT DETERMINATION | | |
| CASE 1 | WITHIN RANGE | OUT OF RANGE | LEFT IMAGING SYSTEM FOCUS POSITION P1 |
| CASE 2 | OUT OF RANGE | WITHIN RANGE | RIGHT IMAGING SYSTEM FOCUS POSITION P2 |
| CASE 3 | OUT OF RANGE | OUT OF RANGE | FOCUS POSITION OF IMAGING SYSTEM INCLUDING LEFT AND RIGHT FOCUS POSITIONS IN DEPTH OF FIELD |
| CASE 4 | WITHIN RANGE | WITHIN RANGE | FOCUS POSITION WITH SMALLER PARALLAX |

STEREOSCOPIC IMAGING APPARATUS AND STEREOSCOPIC IMAGING METHOD

BACKGROUND OF THE INVENTION

1. Field of the Invention

The presently disclosed subject matter relates to a stereoscopic imaging apparatus including a plurality of imaging devices and a stereoscopic imaging method using a plurality of imaging devices, and particularly, to a stereoscopic imaging apparatus and a stereoscopic imaging method configured to obtain a stereoscopic image in which displacement (deviation) of focus positions of the imaging devices is prevented (decreased or minimized), by which stereoscopic view is easily obtained, and eyes of a viewer hardly get tired.

2. Description of the Related Art

There is a known stereoscopic imaging apparatus including: a left imaging system that includes a left imaging optical system with a focus lens and that images a subject to generate a photographic image for a left eye (a left eye image); and a right imaging system that includes a right imaging optical system with a focus lens and that images the subject to generate a photographic image for a right eye (a right eye image). The stereoscopic imaging apparatus allows stereoscopic view display by using the left eye image and right eye image.

Japanese Patent Application Laid-Open No. 2006-162990 discloses a configuration for preventing focus position deviation by performing AF (automatic focus adjustment process) by a left imaging system and a right imaging system and setting the focus lens of one imaging system on the focus lens position where the high-frequency component of a photographic image obtained by another imaging system is the maximum.

Japanese Patent Application Laid-Open No. 8-194274 discloses a configuration including a convergence angle adjustment mechanism configured to adjust a convergence angle of imaging optical systems.

SUMMARY OF THE INVENTION

There is binocular parallax in a stereoscopic imaging apparatus. Therefore, if the focus area is set at the center of the angle of view, the focus positions of the left imaging system and the right imaging system may be deviated. The three dimensional effect of image may be lost due to the deviation of focus position.

In the configuration of Japanese Patent Application Laid-Open No. 2006-162990, the focus positions coincide in the left imaging system and the right imaging system. However, the coincided focus positions may be out of a stereoscopic view possible range, and an appropriate stereoscopic image may not be obtained.

In the configuration of Japanese Patent Application Laid-Open No. 8-194274, a mechanism configured to adjust the convergence angle is essential, and such a mechanism is complicated by any means, resulting in a large apparatus size and a high cost.

The presently disclosed subject matter has been made in view of the circumstances, and an object of the presently disclosed subject matter is to provide a stereoscopic imaging apparatus and a stereoscopic imaging method capable of obtaining a stereoscopic image in which deviation of focus position is prevented, by which stereoscopic view is easily obtained, and eyes of a viewer hardly get tired, and capable of making the size of apparatus compact.

To attain the object, a first aspect of the presently disclosed subject matter provides a stereoscopic imaging apparatus including: a first imaging device configured to include a first imaging optical system with a first focus lens and to image a subject to generate a first image; a second imaging device configured to include a second imaging optical system with a second focus lens and to image the subject to generate a second image; a lens driving device configured to move the first and second focus lenses along a first optical axis of the first imaging optical system and a second optical axis of the second imaging optical system, respectively; a focus position detection device configured to detect a first focus position in an imaging space of the first focus lens and a second focus position in an imaging space of the second focus lens; a stereoscopic view possible range calculation device configured to calculate a stereoscopic view possible range where a parallax amount of the first imaging device and the second imaging device is within an acceptable range; a focus position determination device configured to determine whether the focus positions are within the stereoscopic view possible range; and a focus control device configured to cause the first focus lens and the second focus lens to focus on one focus position of the first focus position and the second focus position, said one focus position determined to be within the stereoscopic view possible range. According to the aspect, the first and second focus lenses focus on the focus position in the stereoscopic view possible range even if the subject is not at the intersection (cross point) of the optical axes of the imaging optical systems and if the focus search is performed by the imaging devices by setting the focus area at the center of the angle of view. Therefore, a stereoscopic image can be obtained in which deviation of focus position is prevented, stereoscopic view is easy, the eyes do not get tired easily, and the three dimensional effect is excellent. Moreover, since a mechanism for adjusting the convergence angle is not necessary, an inexpensive stereoscopic imaging apparatus with compact apparatus size can be provided.

In the present specification, a space where a subject to be imaged exists (i.e. space to be imaged) is referred to as an "imaging space". In the present specification, a position in the imaging space where the focus lens focuses on when the focus lens focuses on a specific range (focus area) in the angle of view (i.e. position of subject that the focus lens focuses on) is referred to as a "focus position". For example, when the focus lens focuses on the center of the angle of view, the position of the subject existing on the optical axis of the imaging optical system is the "focus position". In this case, the focus position can be expressed using a subject distance. In the present specification, a lens position of the focus lens focusing on the subject in a specific range (focus area) in the angle of view is referred to as a "focus lens position".

A second aspect of the presently disclosed subject matter provides a stereoscopic imaging apparatus including: a first imaging device configured to include a first imaging optical system with a first focus lens and to image a subject to generate a first image; a second imaging device configured to include a second imaging optical system with a second focus lens and to image the subject to generate a second image; a lens driving device configured to move the first and second focus lenses along a first optical axis of the first imaging optical system and a second optical axis of the second imaging optical system, respectively; a focus position detection device configured to detect a first focus position in an imaging space of the first focus lens and a second focus position in an imaging space of the second focus lens; a field depth calculation device configured to calculate depths of field of the imaging devices; a focus position determination device configured to determine whether both the first focus position and the second focus position are included in the depths of field of the imaging devices; and a focus control device configured to cause the first focus lens and the second focus lens to focus on one of the focus positions detected by the imaging device, the depth of field of which includes both the first focus position and the second focus position. According to the aspect, the first and second focus lenses focus on one of the focus positions detected by the imaging device including both focus positions in the depth of field even if the subject is not at the intersection (cross point) of the optical axes of the imaging optical systems and if the focus search is performed by the imaging devices by setting the focus area at the center of the angle of view. Therefore, an excellent stereoscopic image can be obtained in which deviation of focus position is prevented, stereoscopic view is easy, and the eyes do not get tired easily. Moreover, since a mechanism for adjusting the convergence angle is not necessary, an inexpensive stereoscopic imaging apparatus having a compact apparatus size can be provided.

A third aspect of the presently disclosed subject matter provides a stereoscopic imaging apparatus including: a first imaging device configured to include a first imaging optical system with a first focus lens and to image a subject to generate a first image; a second imaging device configured to include a second imaging optical system with a second focus lens and to image the subject to generate a second image; a lens driving device configured to move the first and second focus lenses along a first optical axis of the first imaging optical system and a second optical axis of the second imaging optical system, respectively; a focus position detection device configured to detect a first focus position in an imaging space of the first focus lens and a second focus position in an imaging space of the second focus lens; a parallax amount calculation device configured to calculate a parallax amount of the first imaging device and the second imaging device for each of the focus positions; a focus position determination device configured to determine the focus position with the smaller parallax amount from among the first focus position and the second focus position; and a focus control device configured to cause the first focus lens and the second focus lens to focus on the focus position determined by the focus position determination device to have the smaller parallax amount. According to the aspect, the first and second focus lenses focus on the focus position with the smaller parallax amount even if the subject is not at the intersection (cross point) of the optical axes of the imaging optical systems and if the focus search is performed by the imaging devices by setting the focus area at the center of the angle of view. Therefore, an excellent stereoscopic image can be obtained in which deviation of focus position is prevented, stereoscopic view is easy, and the eyes do not get tired. Moreover, since a mechanism for adjusting the convergence angle is not necessary, an inexpensive stereoscopic imaging apparatus having a compact apparatus size can be provided.

A fourth aspect of the presently disclosed subject matter provides a stereoscopic imaging apparatus including: a first imaging device configured to include a first imaging optical system with a first focus lens and to image a subject to generate a first image; a second imaging device configured to include a second imaging optical system with a second focus lens and to image the subject to generate a second image; a lens driving device configured to move the first and second focus lenses along a first optical axis of the first imaging optical system and a second optical axis of the second imaging optical system, respectively; a focus position detection device configured to detect a first focus position in an imaging space of the first focus lens and a second focus position in an imaging space of the second focus lens; a stereoscopic view possible range calculation device configured to calculate a stereoscopic view possible range where a parallax amount of the first imaging device and the second imaging device is within an acceptable range; a field depth calculation device configured to calculate depths of field of the imaging devices; a parallax amount calculation device configured to calculate the parallax amount of the first imaging device and the second imaging device for each of the focus positions; a focus position selection device configured to select one focus position from among the first focus position and the second focus position based on the first focus position, the second focus position, the stereoscopic view possible range, the depths of field, and the parallax amounts; and a focus control device configured to cause the lens driving device to focus the first focus lens and the second focus lens on the selected focus position.

A fifth aspect of the presently disclosed subject matter provides the stereoscopic imaging apparatus according to the first aspect, further including a field depth calculation device configured to calculate depths of field of the imaging devices, wherein the focus position determination device determines whether both the first focus position and the second focus position are included in the depths of field of the imaging devices, and the focus control device causes the first focus lens and the second focus lens to focus on one of the focus positions detected by the imaging device, the depth of field of which includes both the first focus position and the second focus position in the depth of field if both the first focus position and the second focus position are within the stereoscopic view possible range.

A sixth aspect of the presently disclosed subject matter provides the stereoscopic imaging apparatus according to the first aspect, further including a parallax amount acquisition device configured to acquire parallax amounts of the focus positions in the first image and the second image, wherein the focus control device causes the first focus lens and the second focus lens to focus on one of the first focus position and the second focus position with the smaller parallax amount if both the first focus position and the second focus position are within the stereoscopic view possible range.

A seventh aspect of the presently disclosed subject matter provides the stereoscopic imaging apparatus according to any one of the first, fifth, and sixth aspects, further including a field depth calculation device that calculates depths of field of the imaging devices, wherein the focus position determination device determines whether both the first focus position and the second focus position are included in the depths of field of the imaging devices, and the focus control device causes the first focus lens and the second focus lens to focus on one of the focus positions detected by the imaging device, the depth of field of which includes both the first focus position and the second focus position in the depth of field if both the first focus position and the second focus position are out of the stereoscopic view possible range.

An eighth aspect of the presently disclosed subject matter provides the stereoscopic imaging apparatus according to any one of the first, fifth, and sixth aspects, further including a parallax amount acquisition device configure to acquire parallax amounts of the focus positions in the first image and the second image, wherein the focus control device causes the first focus lens and the second focus lens to focus on one of the first focus position and the second focus position with the smaller parallax amount if both the first focus position and the second focus position are out of the stereoscopic view possible range.

A ninth aspect of the presently disclosed subject matter provides the stereoscopic imaging apparatus according to the first aspect, wherein the focus position determination device determines whether the focus positions are between an intersection of the optical axes of the imaging optical systems and a near point of the stereoscopic view possible range, and the focus control device causes the first focus lens and the second focus lens to focus on one of the first focus position and the second focus position determined to be between the intersection and the near point of the stereoscopic view possible range.

A tenth aspect of the presently disclosed subject matter provides the stereoscopic imaging apparatus according to the ninth aspect, wherein the focus control device causes the first focus lens and the second focus lens to focus on one of the first focus position and the second focus position closest to the near point if both the first focus position and the second focus position are between the intersection and the near point of the stereoscopic view possible range.

An eleventh aspect of the presently disclosed subject matter provides a stereoscopic imaging method using: a first imaging device configured to include a first imaging optical system with a first focus lens and to image a subject to generate a first image; a second imaging device configured to include a second imaging optical system with a second focus lens and to image the subject to generate a second image; and a lens driving device configured to move the first and second focus lenses along a first optical axis of the first imaging optical system and a second optical axis of the second imaging optical system, respectively, the stereoscopic imaging method including: a focus position detection step of moving the focus lenses by the lens driving device to detect a first focus position in an imaging space of the first focus lens and a second focus position in an imaging space of the second focus lens; a stereoscopic view possible range calculation step of calculating a stereoscopic view possible range where a parallax amount of the first imaging device and the second imaging device is within an acceptable range; a focus position determination step of determining whether the focus positions are within the stereoscopic view possible range; and a focus step of causing the lens driving device to focus the first focus lens and the second focus lens on one focus position of the first focus position and the second focus position, said one focus position determined to be within the stereoscopic view possible range.

A twelfth aspect of the presently disclosed subject matter provides a stereoscopic imaging method using: a first imaging device configured to include a first imaging optical system with a first focus lens and to image a subject to generate a first image; a second imaging device configured to include a second imaging optical system with a second focus lens and to image the subject to generate a second image; and a lens driving device configured to move the first and second focus lenses along a first optical axis of the first imaging optical system and a second optical axis of the second imaging optical system, respectively, the stereoscopic imaging method including: a focus position detection step of moving the focus lenses by the lens driving device to detect a first focus position in an imaging space of the first focus lens and a second focus position in an imaging space of the second focus lens; a field depth calculation step of calculating depths of field of the imaging devices; a focus position determination step of determining whether both the first focus position and the second focus position are included in the depths of field of the imaging devices; and a focus step of causing the lens driving device to focus the first focus lens and the second focus lens on one of the focus positions detected by the imaging device, the depth of field of which includes both the first focus position and the second focus position.

A thirteenth aspect of the presently disclosed subject matter provides a stereoscopic imaging method using: a first imaging device configured to include a first imaging optical system with a first focus lens and to image a subject to generate a first image; a second imaging device configured to include a second imaging optical system with a second focus lens and to image the subject to generate a second image; and a lens driving device configured to move the first and second focus lenses along a first optical axis of the first imaging optical system and a second optical axis of the second imaging optical system, respectively, the stereoscopic imaging method including: a focus position detection step of moving the focus lenses by the lens driving device to detect a first focus position in an imaging space of the first focus lens and a second focus position in an imaging space of the second focus lens; a parallax amount calculation step of calculating a parallax amount of the first imaging device and the second imaging device for each of the focus positions; a focus position determination step of determining the focus position with the smaller parallax amount from among the first focus position and the second focus position; and a focus step of causing the lens driving device to focus the first focus lens and the second focus lens on the focus position determined at the focus position determination step to have the smaller parallax amount.

A fourteenth aspect of the presently disclosed subject matter provides a stereoscopic imaging method using: a first imaging device configured to include a first imaging optical system with a first focus lens and to image a subject to generate a first image; a second imaging device configured to include a second imaging optical system with a second focus lens and to image the subject to generate a second image; and a lens driving device configured to move the first and second focus lenses along a first optical axis of the first imaging optical system and a second optical axis of the second imaging optical system, respectively, the stereoscopic imaging method including: a focus position detection step of moving the focus lenses by the lens driving device to detect a first focus position in an imaging space of the first focus lens and a second focus position in an imaging space of the second focus lens; a stereoscopic view possible range calculation step of calculating a stereoscopic view possible range in the imaging space where a parallax amount of the first imaging device and the second imaging device is within an acceptable range; a field depth calculation step of calculating depths of field of the imaging devices; a parallax amount calculation step of calculating a parallax amount of the first imaging device and the second imaging device for each of the focus positions; a focus position selection step of selecting one focus position from among the first focus position and the second focus position based on the first focus position, the second focus position, the stereoscopic view possible range, the depths of field, and the parallax amounts; and a focus step of causing the lens driving device to focus the first focus lens and the second focus lens on the selected focus position.

A fifteenth aspect of the presently disclosed subject matter provides a stereoscopic imaging method using: a first imaging device configured to include a first imaging optical system with a first focus lens and to image a subject to generate a first image; a second imaging device configured to include a second imaging optical system with a second focus lens and to image the subject to generate a second image; and a lens driving device configured to move the first and second focus lenses along a first optical axis of the first imaging optical system and a second optical axis of the second imaging optical system, respectively, the stereoscopic imaging method including: a focus position detection step of moving the focus lenses by the lens driving device to detect a first focus position in an imaging space of the first focus lens and a second focus position in an imaging space of the second focus lens; a stereoscopic view possible range calculation step of calculating a stereoscopic view possible range in the imaging space where a parallax amount of the first imaging device and the second imaging device is within an acceptable range; a focus position determination step of determining whether the focus positions are between an intersection of the optical axes of the imaging optical systems and a near point of the stereoscopic view possible range; and a focus step of causing the lens driving device to focus the first focus lens and the second focus lens on one focus position of the first focus position and the second focus position, said one focus position determined to be between the intersection and the near point of the stereoscopic view possible range.

According to the presently disclosed subject matter, a stereoscopic image can be obtained, in which deviation of focus position is prevented, by which stereoscopic view is easily obtained, and the eyes of the viewer hardly get tired, and the size of apparatus can be made compact.

BRIEF DESCRIPTION OF THE DRAWINGS

FIGS. 26A and 26B are flowcharts illustrating an example of a flow of a stereoscopic imaging control process according to the fifth embodiment;

FIG. 27 is an explanatory diagram illustrating an example of a determination table of focus position at imaging; and FIG. 28 is an explanatory diagram illustrating another example of the determination table of focus position at imaging.

DETAILED DESCRIPTION OF THE PREFERRED EMBODIMENTS

Embodiments of the presently disclosed subject matter will now be described in detail with reference to the drawings.

Figure 1:
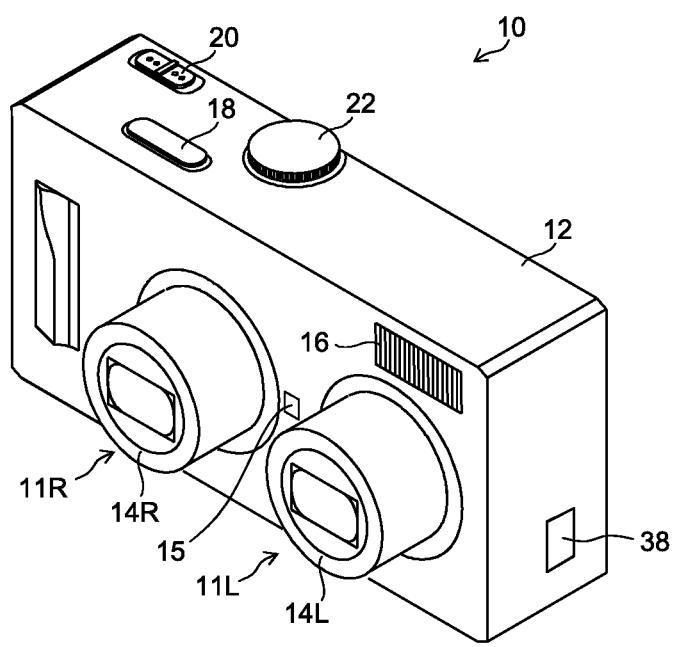
FIG. 1 is a front perspective view illustrating an external configuration of a digital camera according to the presently disclosed subject matter.
Figure 2:
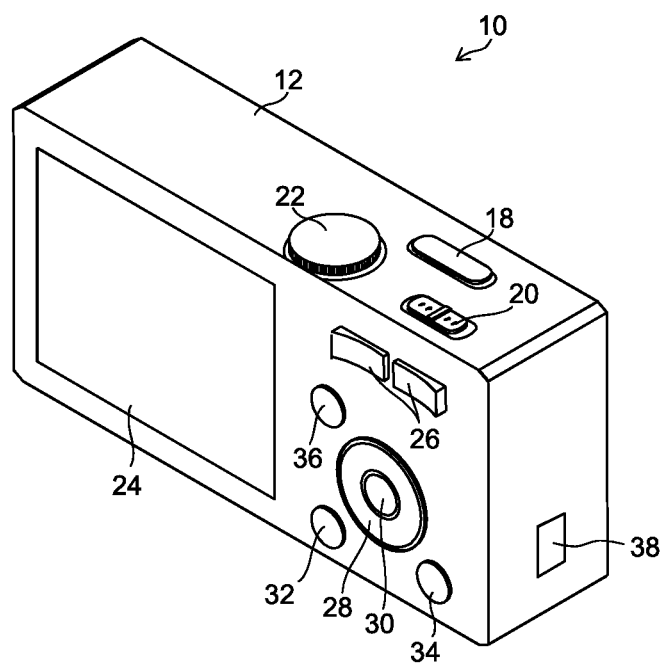
FIG. 2 is a back perspective view illustrating an external configuration of the digital camera according to the presently disclosed subject matter.

FIG. 1 is a front perspective view illustrating an external configuration of a digital camera according to one embodiment of the presently disclosed subject matter. FIG. 2 is a back perspective view of the digital camera of FIG. 1.

The digital camera 10 of the present embodiments is an example of a stereoscopic imaging apparatus including a plurality of imaging systems (hereinafter, referred to as "imaging devices"), and can image the identical subject from a plurality of viewpoints.

Although two imaging systems are illustrated in the present embodiments for convenience of description, the presently disclosed subject matter can also be applied in the same way when there are three or more imaging systems. The imaging systems (mainly photographing lenses 14R and 14L) may not be aligned in a line in a horizontal direction, but may be two-dimensionally arranged.

A digital camera body 12 of the digital camera 10 is formed in a rectangular box shape. As illustrated in FIG. 1, the pair of photographing lenses 14R and 14L, a fill light emission unit 15, a flash 16, etc. are arranged on the front side of the digital camera body 12. A shutter button 18, a power/mode switch 20, a mode dial 22, etc. are arranged on the upper surface of the digital camera body 12.

As illustrated in FIG. 2, a monitor 24, zoom buttons 26, cross buttons 28, a MENU/OK button 30, a DISP button 32, a BACK button 34, a vertical imaging/horizontal imaging switch button 36, etc. are arranged on the back side of the digital camera body 12.

The pair of right and left photographing lenses 14R and 14L are constituted by collapsible lenses and include macro imaging functions (proximity imaging functions). When the power of the digital camera 10 is turned on, the photographing lenses 14R and 14L are extended from the digital camera body 12. A zoom mechanism, a collapse mechanism, and a macro imaging mechanism of photographing lens are known techniques, and the specific configurations will not be described here.

The flash 16 emits light for main imaging to an imaging space. The flash 16 of the present embodiment is constituted by a xenon tube or an LED (light-emitting diode), and the flash 16 emits light as necessary to image a dark subject or during backlight.

The shutter button 18 is constituted by a two-stroke switch capable of so-called "half-press" and "full-press". During still image photographing (for example, when a still image photographing mode is selected by the mode dial 22, or the menu), the digital camera 10 executes imaging preparation processes which includes AE (Automatic Exposure) process, AF (Automatic Focus adjustment) process, and AWB (Automatic White Balance) process when the shutter button 18 is half-pressed, and executes main imaging and a recording process of a photographic image when the shutter button 18 is full-pressed. Hereinafter, the half-press may be referred to as "focusing instruction" because at least the AF process is executed, and the full-press may be referred to as "imaging instruction" because at least the recording process of the photographic image is executed. During moving image photographing (for example, when a moving image photographing mode is selected by the mode dial 22, or the menu), the digital camera 10 starts imaging a moving image when the shutter button 18 is full-pressed and ends imaging when the shutter button 18 is full-pressed again. By default, a moving image may be imaged while the shutter button 18 is full-pressed, and the imaging may be terminated when the full-press is released. A shutter button specific to still image photographing or a shutter button specific to moving image photographing may also be arranged.

The power/mode switch 20 functions as a power switch of the digital camera 10 and functions as a switching device for switching a reproduction mode and a photographing mode of the digital camera 10. The power/mode switch 20 is slidable between an "OFF position", a "reproduction position", and a "photographing position". The digital camera 10 is set to the reproduction mode when the power/mode switch 20 is located on the "reproduction position", and the digital camera 10 is set to the photographing mode when the power/mode switch 20 is located on the "photographing position". The power is turned off when the power/mode switch 20 is located on the "OFF position".

The mode dial 22 is used to set details of the photographing mode and the reproduction mode. The mode dial 22 is rotatably arranged on the upper surface of the digital camera body 12, and a click mechanism not illustrated can set the mode dial 22 to a "2D still image position", a "2D moving image position", a "3D still image position", and a "3D moving image position".

When the mode dial 22 is set to the "2D still image position" in the photographing mode, a 2D still image photographing mode for imaging a two dimensional (2D) still image is set, and a flag indicative of a 2D mode is set to a 2D/3D mode switch flag. When the mode dial 22 is set to the "2D moving image position", a 2D moving image photographing mode for imaging a 2D moving image is set, and a flag indicative of the 2D mode is set to the 2D/3D mode switch flag. When the mode dial 22 is set to the "3D still image position", a 3D still image photographing mode for imaging a three dimensional (3D) still image is set, and a flag indicative of a 3D mode is set to the 2D/3D mode switch flag. When the mode dial 22 is set to the "3D moving image position", a 3D moving image photographing mode for imaging a 3D moving image is set, and a flag indicative of the 3D mode is set to the 2D/3D mode switch flag. A CPU (Central Processing Unit) 110 described below refers to the 2D/3D mode switch flag to recognize which one of the 2D mode and the 3D mode is set.

The "2D" denotes two dimensions (i.e. plane), and the "3D" denotes three dimensions (i.e. solid). The 2D imaging denotes imaging and recording of a photographic image (2D image) from a single viewpoint (also referred to as "two-dimensional imaging" and "plane imaging"), and 2D display denotes displaying of a photographic image (2D image) from a single viewpoint (also referred to as "two-dimensional display" and "plane display"). The 3D imaging denotes imaging and recording of photographic images (3D images) from a plurality of viewpoints (also referred to as "three-dimensional imaging" and "stereoscopic view imaging"), and 3D display denotes displaying of photographic images (3D images) from a plurality of viewpoints (also referred to as "three-dimensional display" and "stereoscopic view display"). Although photographic images from a plurality of viewpoints obtained by 3D imaging are usually three-dimensionally displayed, only a photographic image from one viewpoint among the photographic images of the plurality of viewpoints can be two-dimensionally displayed in some cases.

The monitor 24 is a display device such as a color liquid crystal panel. The monitor 24 is used as an image display unit for displaying photographed images and used as a GUI (graphical user interface) for various settings. During imaging, the monitor 24 sequentially displays images (live view images, or through images) continuously captured by imaging elements 134R and 134L and is used as an electronic finder.

The zoom buttons 26 are used for zooming operations of the photographing lenses 14R and 14L and constituted by a zoom telephoto button for instructing telephotographic zoom and a zoom wide button for instructing wide-angle zoom.

The cross buttons 28 can be pressed and operated in vertical and horizontal four directions, and functions according to the setting state of the digital camera are allocated to the direction buttons.

The MENU/OK button 30 is used to invoke a menu screen (MENU function) as well as to confirm the content of selection and instruct the execution of a process (OK function).

The DISP button 32 is used to input a switch instruction of the display content of the monitor 24, etc. The BACK button 34 is used to input an instruction, such as canceling of an input operation.

The vertical imaging/horizontal imaging switch button 36 is a button for instructing whether to take an image by the vertical imaging or the horizontal imaging.

An input/output connector 38 is used for wire communications with the outside. Photographed images can be inputted to the digital camera 10 through the input/output connector 38.

Figure 3:
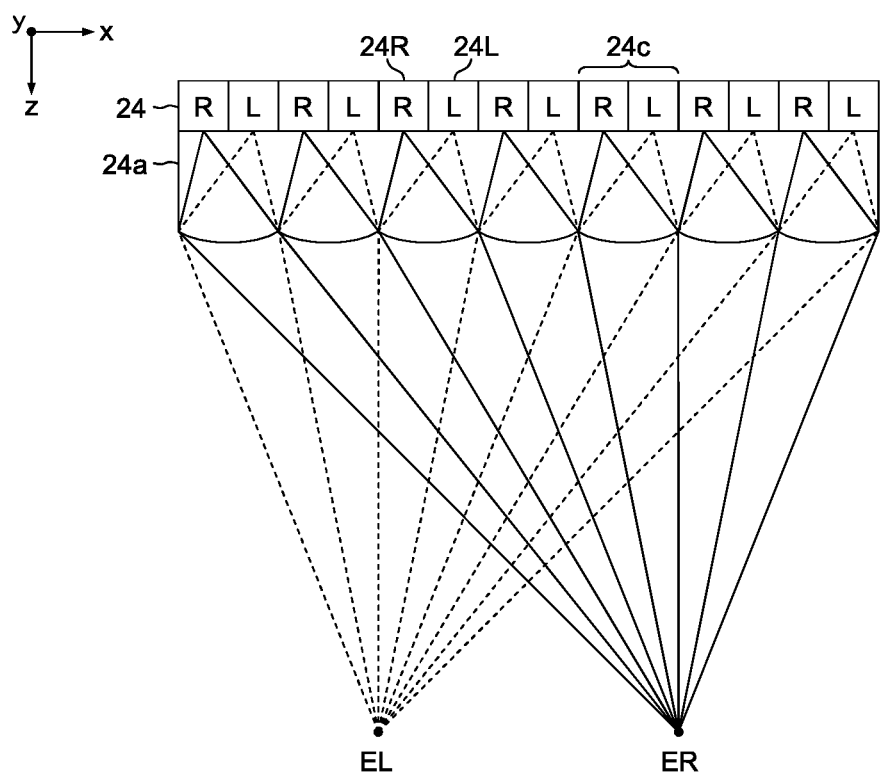
FIG. 3 is an explanatory diagram for explaining an example of structure of a monitor capable of stereoscopic view display.

FIG. 3 is an explanatory diagram for explaining an example of structure of the monitor 24 capable of stereoscopic view display. A lenticular system is used in the present embodiment, and the monitor 24 arranged with lenticular lenses including a semicircular lens group on the front side is used.

Lenticular lenses 24a are arranged on the front side (z-axis direction where the viewpoint (left eye EL and right eye ER) of the observer exists) of the monitor 24. The lenticular lenses 24a are constituted by arranging a plurality of cylindrical convex lenses in an x-axis direction of FIG. 3.

Display areas of a stereoscopic image (also referred to as "3D image") displayed on the monitor 24 are constituted by left eye strip image display areas 24L and right eye strip image display areas 24R. The left eye strip image display areas 24L and the right eye strip image display areas 24R have elongated strip shapes in a y-axis direction of FIG. 3 of the screen and are alternately arranged in the x-axis direction of FIG. 3.

Convex lenses constituting the lenticular lenses 24a are formed at positions corresponding to strip set image display areas 24c including sets of the left eye strip image display areas 24L and the right eye strip image display areas 24R based on a given observation point of the observer.

In FIG. 3, left eye strip images displayed in the left eye strip image display areas 24L of the monitor 24 are injected to the left eye EL of the observer by the light refraction effect of the lenticular lenses 24a. Right eye strip images displayed on the right eye strip image display areas 24R of the monitor 24 are injected to the right eye ER of the observer by the light refraction effect of the lenticular lenses 24a. Therefore, the left eye of the observer sees only the left eye strip images, and the right eye of the observer sees only the right eye strip images. The stereoscopic view is possible by the left/right parallax based on a left eye image, which is a set of the left eye strip images, and a right eye image, which is a set of the right eye strip images.

Although an example of using the lenticular system as a structure of the monitor 24 for three-dimensional display has been described with reference to FIG. 3, the presently disclosed subject matter is not particularly limited to the lenticular system.

For example, a parallax barrier system may be used, in which the left photographic image and the right photographic image are cut into elongated strip shapes in the vertical direction of the images, the images are alternately aligned and displayed, and the images are provided to the observer through slits that are vertically carved in the same way to thereby deliver the left photographic image to the left eye of the observer and the right photographic image to the right eye. Other space division systems may also be used.

A light direction control system (also referred to as time division light direction control backlight system) may also be used to control the direction of the backlight illuminating the back side of an LCD (liquid crystal display device) constituting the monitor 24 in the right eye direction and the left eye direction of the observer in a time division manner. The light direction control system is described in Kentaro Toyooka, Tetsuya Miyashita, Tatsuo Uchida, "The three-dimensional display using a field-sequential light direction control back light", Proceedings of Japanese Liquid Crystal Society Annual Meeting 2000, pp. 137-138 (2000) as well as in Japanese Patent Application Laid-Open No. 2004-20684, etc. A so-called scan backlight system described in Japanese Patent 3930021, etc. may also be used.

The stereoscopic view of the image may also be provided by alternately displaying the left and right images and making the observer use image separation glasses.

The monitor 24 is, for example, a liquid crystal display device and an organic EL (electroluminescence) display device. A self-emission system may be used, or a system including a separate light source to control the light quantity may be used. Any system can be used, such as a system based on polarization, anaglyph, and a naked eye system. A system of piling the liquid crystal and the organic EL in multiple layers may also be used.

A summary of 3D imaging (stereoscopic view imaging) and 3D display (stereoscopic view display) in the digital camera 10 illustrated in FIGS. 1 to 3 will be described with reference to FIGS. 4A and 4B.

To facilitate understanding of the invention, a base length SB (interval between optical axes of the imaging systems 11L and 11R in the digital camera 10) and a convergence angle θc (angle formed by the optical axes of the imaging systems 11L and 11R) are fixed in the description.

The plurality of imaging systems 11L and 11R take images of an identical specific target 91 (for example, sphere) from a plurality of viewpoints, i.e. 3D imaging is performed, to generate a plurality of photographic images (the left photographic image (left eye image) 92L and the right photographic image (right eye image) 92R in the present embodiment). The generated photographic images 92L and 92R include specific target images 93L and 93R, respectively, to which the identical specific target 91 is projected.

The photographic images 92L and 92R are displayed on top of each other on the monitor 24 capable of stereoscopic view display, i.e. 3D display is performed, to reproduce a 3D display image 94. In the present embodiment, the 3D display image 94 is constituted by the left photographic image 92L and the right photographic image 92R. An observer 95 observes the 3D display image 94 on the monitor 24 from both eyes 96L and 96R. Consequently, the observer 95 can see a virtual image 97 of the specific target 91 (for example, sphere) popping up. In FIGS. 4A and 4B, the virtual image 97 looks popping up toward the near side because the specific target 91 is at a position closer than an intersection 99 (also referred to as "cross point") of the optical axes. If the specific target is at a position farther than the intersection 99, the virtual image looks popping down toward the far side.

Figure 4A:
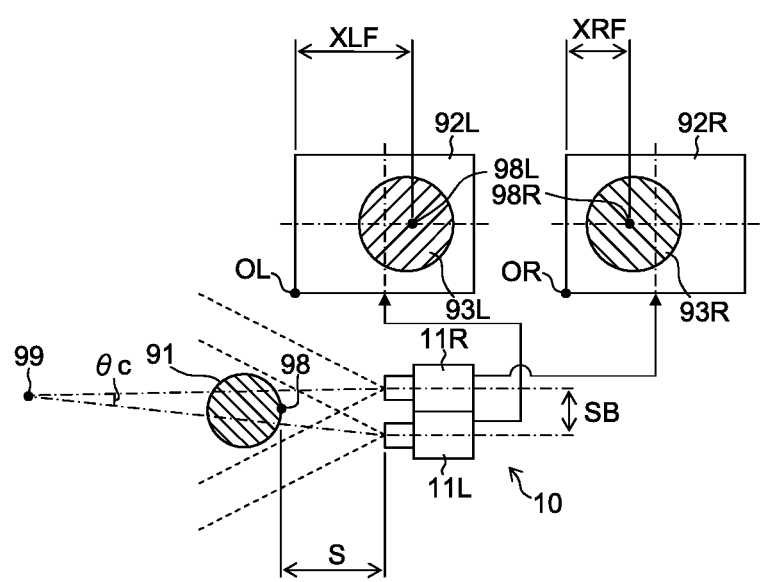
FIGS. 4A and 4B are explanatory diagrams for explaining a configuration for a stereoscopic view imaging and stereoscopic view display.
Figure 4B:
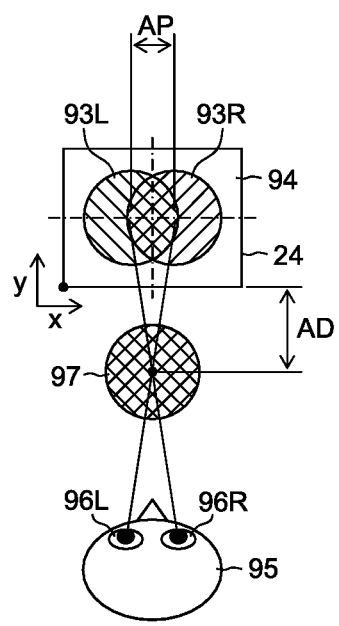

As illustrated in FIGS. 4A and 4B, in a range where a subject distance S is smaller than a distance to the intersection 99 of the optical axes of the imaging systems 11L and 11R, the smaller the subject distance S is, the larger is a difference |XLF−XRF| between center coordinates XLF and XRF (only x coordinates are illustrated in FIGS. 4A and 4B) of the specific target images 93L and 93R on the photographic images 92L and 92R. Therefore, the smaller the subject distance S is, the farther are corresponding points between the photographic images from different viewpoints. The difference |XLF−XRF| includes only x coordinates, and the difference is expressed as a binocular parallax amount AP. In other words, if the base length SB and the convergence angle θc are determined, the smaller the subject distance S is, the greater is AP, and a pop-up amount AD of the virtual image 97 that the observer 95 feels is also greater.

Although the present embodiment has been described in which the base length SB and the convergence angle θc are constant, if the convergence angle θc is variable, the pop-up amount AD changes in accordance with the convergence angle θc and the subject distance S.

If the base length SB is also variable in addition to the convergence angle θc, the pop-up amount AD changes in accordance with the base length SB, the convergence angle θc, and the subject distance S.

Examples of the digital camera 10 illustrated in FIGS. 1 and 2 will be described in the following embodiments.

(First Embodiment)

Figure 5:
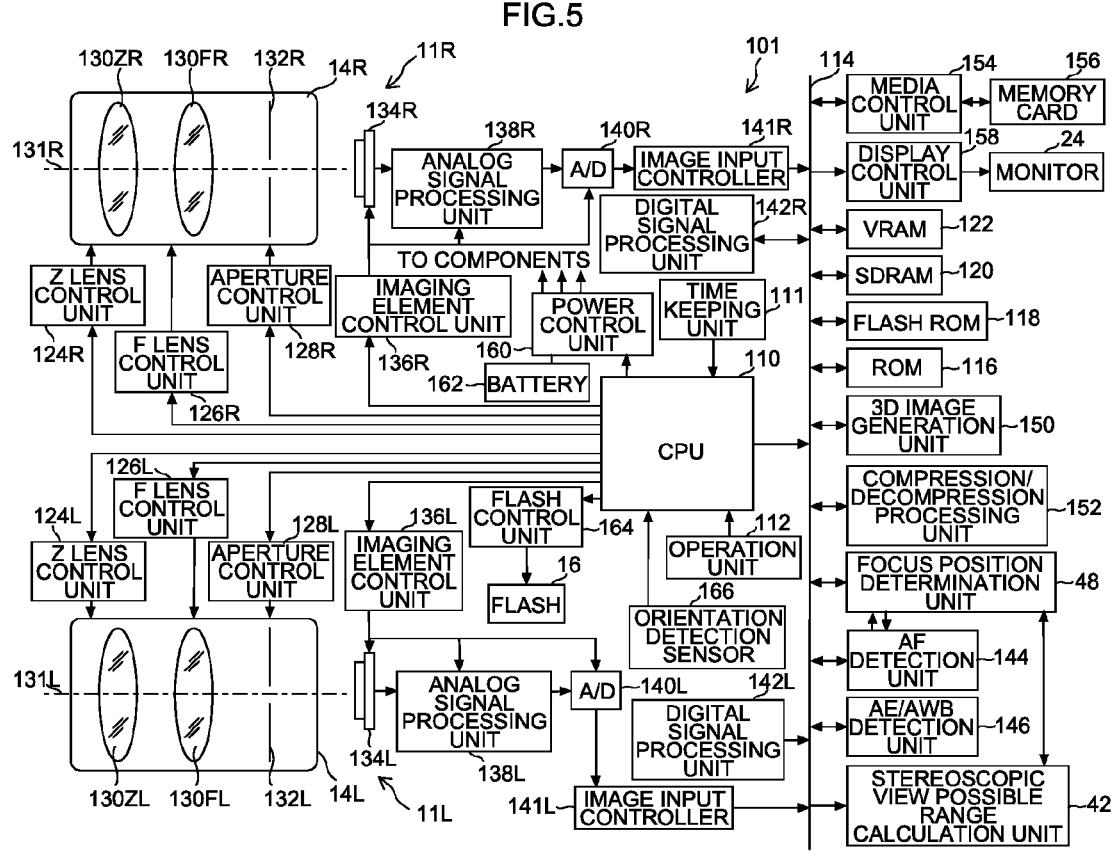
FIG. 5 is a block diagram illustrating an internal configuration of a digital camera according to a first embodiment.

FIG. 5 is a block diagram illustrating an internal configuration of the digital camera 101 according to a first embodiment. The elements illustrated in FIGS. 1 and 2 are designated with the same reference numerals, and the description of the already described content will not be repeated.

As illustrated in FIG. 5, the digital camera 101 of the present embodiment is configured to be able to acquire an image signal from each of the two imaging systems 11L and 11R. The digital camera 101 includes a stereoscopic view possible range calculation unit 42, a focus position determination unit 48, a CPU 110, a time keeping (measuring) unit 111, an operation unit 112, a ROM (read only memory) 116, a flash ROM 118, an SDRAM (synchronous dynamic random access memory) 120, a VRAM (video RAM) 122 (image display memory), zoom lens control units 124 (124L and 124R), focus lens control units 126 (126L and 126R), aperture control units (iris control units) 128 (128L and 128R), imaging elements 134 (134L and 134R), imaging element control units 136 (136L and 136R), analog signal processing units 138 (138L and 138R), A/D converters 140 (140L and 140R), image input controllers 141 (141L and 141R), digital signal processing units 142 (142L and 142R), an AF detection unit 144, an AE/AWB detection unit 146, a 3D image generation unit 150, a compression/decompression processing unit 152, a media control unit 154, a memory card 156, a display control unit 158, a power control unit 160, a battery 162, a flash control unit 164, and an orientation detection sensor 166.

The imaging system 11L for left eye (also referred to as "left imaging device") includes the photographing lens 14L, the zoom lens control unit 124L, the focus lens control unit 126L, the aperture control unit 128L, the imaging element 134L, the imaging element control unit 136L, the analog signal processing unit 138L, the A/D converter 140L, the image input controller 141L, and the digital signal processing unit 142L.

The imaging system 11R for right eye (also referred to as "right imaging device") includes the photographing lens 14R, the zoom lens control unit 124R, the focus lens control unit 126R, aperture control unit 128R, the imaging element 134R, the imaging element control unit 136R, the analog signal processing unit 138R, the A/D converter 140R, the image input controller 141R, and the digital signal processing unit 142R.

In the present specification, an image signal (image data) obtained by imaging a subject by the imaging systems 11L and 11R will be referred to as a "photographic image". A photographic image obtained by the imaging system 11L for left eye will be referred to as a "left photographic image", and a photographic image obtained by the imaging system 11R for right eye will be referred to as a "right photographic image".

The CPU 110 functions as a control device that comprehensively controls the operations of the entire digital camera, such as imaging and reproduction. The CPU 110 controls the components in accordance with predetermined control programs based on input from the operation unit 112.

The time keeping unit 111 keeps the current date/time and measures the time in accordance with a command from the CPU 110.

The operation unit 112 includes the shutter button 18, the power/mode switch 20, the mode dial 22, the zoom buttons 26, the cross buttons 28, the MENU/OK button 30, the DISP button 32, the BACK button 34, the vertical imaging/horizontal imaging switch button 36, illustrated in FIGS. 1 and 2.

The ROM 116 connected through a bus 114 stores control programs executed by the CPU 110, various data necessary for the control, etc. The flash ROM 118 stores user setting information, etc., such as various setting information related to the operations of the digital camera 10.

The SDRAM 120 is used as a calculation work area of the CPU 110 and as a temporary storage area of image data. The VRAM 122 is used as a temporary storage area specific to image data for display.

The pair of left and right photographing lenses 14L and 14R (may be collectively referred to as photographing lenses 14) include zoom lenses 130ZL and 130ZR (may be collectively referred to as zoom lenses 130Z), focus lenses 130FL and 130FR (may be collectively referred to as focus lenses 130F), and apertures 132L and 132R. The left and right photographing lenses 14L and 14R are attached to a main body frame not illustrated of the digital camera body 12 so that optical axes 131L and 131R are parallel at a predetermined interval (SB: base length).

The zoom lens control units 124R and 124L as zoom lens driving devices drive the zoom lenses 130ZR and 130LR respectively, and the zoom lenses 130ZR and 130LR move back and forth along the optical axes thereof. The CPU 110 controls the positions of the zoom lenses 130LR and 130ZR and performs zooming process by the photographing lenses 14L and 14R through the zoom lens control units 124L and 124R.

The focus lens control units 126L and 126R as focus lens driving devices drive the focus lenses 130FL and 130FR respectively, and the focus lenses 130FL and 130FR move back and forth along the optical axes thereof. The CPU 110 controls the positions of the focus lenses 130FL and 130FR and performs focus adjustment process by the photographing lenses 14L and 14R through the focus lens control units 126L and 126R.

The apertures 132L and 132R are constituted by, for example, iris apertures, and driven by an aperture actuator not illustrated for operation. The CPU 110 controls the drive of the aperture actuator through the aperture control units 128L and 128R to control openings (aperture values) of the apertures 132L and 132R to control the light quantity entering the imaging elements 134L and 134R.

The CPU 110 synchronizes and drives the left and right photographing lenses 14L and 14R to drive the zoom lenses 130ZL and 130ZR, the focus lenses 130FL and 130FR, and the apertures 132L and 132R constituting the photographing lenses 14L and 14R. More specifically, the left and right photographing lenses 14L and 14R are always set at the same focus distance (zoom magnification), and the focuses are adjusted to always focus the same subject. Furthermore, the apertures are adjusted so that the injected light quantities (aperture values) are always the same.

The imaging elements 134L and 134R are constituted by color CCD (charge-coupled device) including a color filter (for example, R (red), G (green), B (blue)) arranged in the predetermined pattern. A multiplicity of photodiodes are two-dimensionally arranged on the light receiving surface of the CCD. The photodiodes convert an optical image of a subject (subject image), which is formed by the photographing lenses 14L and 14R on the light receiving surface of the CCD, into signal charge corresponding to the injected light quantity. The signal charge accumulated on the photodiodes is sequentially read out from the imaging elements 134L and 134R as a voltage signal (image signal) corresponding to the signal charge based on the drive pulse provided from the imaging element control units 136L and 136R in accordance with a command of the CPU 110. The imaging elements 134L and 134R include functions of an electronic shutter, and the exposure time (shutter speed) is controlled by controlling the charge storage time in the photodiodes. Although the CCD is used as the imaging elements in the present embodiment, imaging elements in other configurations, such as a CMOS (complementary metal-oxide semiconductor) sensor, can also be used.

The analog signal processing units 138L and 138R include: a correlated double sampling circuit (CD) for removing reset noise (low frequency) included in an image signal outputted from the imaging elements 134L and 134R; and an AGC (Automatic Gain Control) circuit for amplifying the image signal to control the image signal to the size of a certain level. The analog signal processing units 138L and 138R apply a correlated double sampling process to the image signal outputted from the imaging elements 134L and 134R and amplify the image signal. The A/D converters 140L and 140R convert an analog image signal outputted from the analog signal processing units 138L and 138R into a digital image signal. The image input controllers 141L and 141R import (obtain) the image signal outputted from the A/D converters 140L and 140R and store the image signal in the SDRAM 120. In the present embodiment, a left photographic image and a right photographic image are temporarily stored in the SDRAM 120. The digital signal processing units 142L and 142R import (obtain) the image signal stored in the SDRAM 120 in accordance with a command from the CPU 110 and apply predetermined signal processing to the image signal to generate image data (Y/C signal) made of a luminance signal Y and color difference signals Cr and Cb. The digital signal processing units 142L and 142R also perform various digital corrections in accordance with a command from the CPU 110, such as an offset process, a white balance adjustment process, a gamma correction process, an RGB interpolation process, an RGB/YC conversion process, a noise reduction process, a contour correction process, a tone correction, and a light source type determination process. The digital signal processing units 142L and 142R may be constituted by hardware circuits, or the same functions may be constituted by software.

The AF detection unit 144 imports image signals (photographic images) of R, G, and B colors imported from one of the image input controllers 141 and calculates a focus evaluation value. The AF detection unit 144 of the embodiment includes: a high-pass filter that passes through only high-frequency components of a G signal; an absolute value forming processor; a focus area extraction unit that cuts out a signal in a predetermined focus area set in the screen; and an integration unit that integrates absolute value data in the focus area. The AF detection unit 144 calculates the absolute value data in the focus area integrated by the integration unit as the focus evaluation value. The focus evaluation value indicates a contrast of the photographic image in the focus area.

The CPU 110 searches a lens position (focus lens position) where the focus evaluation value outputted from the AF detection unit 144 in the focus area is local maximum during the AF control and moves the focus lenses 130FL and 130FR to the lens position to focus the subject to be focused in the imaging space. For example, the CPU 110 first moves the focus lenses 130FL and 130FR from the closest distance to the infinite distance, sequentially acquires focus evaluation values from the AF detection unit 144 in the moving process, detects the lens position where the focus evaluation value is local maximum in the focus area, and moves the focus lenses 130FL and 130FR to the lens position (focus lens position). In this way, the subject (main subject) positioned in the focus area in the angle of view is focused. The focus positioning of the imaging systems 11L and 11R will be described in detail later.

The AE/AWB detection unit 146 imports the image signals of R, G, and B colors imported from the image input controller 141R and calculates integrated values necessary for the AE control and the AWB control. The AE/AWB detection unit 146 of the present example divides one screen into a plurality of areas (for example, 8×8=64 areas) and calculates an integrated value of the R, G, and B signals in each divided area.

The CPU 110 acquires the integrated value of the R, G, and B signals in each area calculated by the AE/AWB detection unit 146 during the AE control and obtains the brightness (photometric value) of the subject to set the exposure. In other words, the CPU 110 sets the sensitivity, the aperture values, the shutter speed, and the necessity of flash emission.

The CPU 110 acquires the integrated value of the R, G, and B signals in each area calculated by the AE/AWB detection unit 146 during the AWB control, calculates a gain value for white balance adjustment, and detects a light source type.

The 3D image generation unit 150 generates 3D image data from image data obtained from the left and right dual image systems during 3D imaging (during 3D still image photographing mode or 3D moving image photographing mode).

During the 3D still image photographing mode, the digital camera of the present embodiment generates images aligned in parallel, the images including a left photographic image taken by the left imaging system and a right photographic image taken by the right imaging system, and the images are recorded in the memory card 156 as 3D image data. During the 3D moving image photographing mode, 3D moving images of time division system are generated, and the 3D moving images are recorded in the memory card 156. This type of generation method of 3D images is a known technique, and the specific generation method will not be described here.

The compression/decompression processing unit 152 applies a compression process in a predetermined format to the inputted image data in accordance with a command from the CPU 110 to generate compressed image data. The compression/decompression processing unit 152 applies a decompression process in a predetermined format to the inputted compressed image data in accordance with a command from the CPU 110 to generate uncompressed image data.

The media control unit 154 controls reading/writing of data to and from the memory card 156 in accordance with a command from the CPU 110.

The display control unit 158 controls display to the monitor 24 in accordance with a command from the CPU 110. More specifically, the display control unit 158 converts an inputted image signal into a video signal (for example, NTSC (National Television System Committee) signal, PAL (Phase Alternation by Line) signal, or SECAM (sequential couleur a memoire) signal) for display on the monitor 24 and outputs the video signal to the monitor 24. The display control unit 158 also combines a signal of predetermined characters, drawings, symbols, etc. with an image signal and outputs the signal to the monitor 24 (so called on-screen display).

The power control unit 160 controls power supply from the battery 162 to the components in accordance with a command from the CPU 110.

The flash control unit 164 controls emission of the flash 16 in accordance with a command from the CPU 110.

The orientation detection sensor 166 detects the orientation (vertical and horizontal inclination) of the digital camera body 12 and outputs the result to the CPU 110. More specifically, the orientation detection sensor 166 detects an inclination angle in the horizontal direction of the digital camera body 12 (rotation angle around the optical axes of the photographing lenses 14L and 14R) and an inclination angle in the vertical direction of the digital camera body 12 (inclination angle in the vertical direction of the optical axes of the photographing lenses 14L and 14R).

The stereoscopic view possible range calculation unit 42 calculates a range (hereinafter, referred to as "stereoscopic view possible range") in the imaging space, in which the parallax amount of the left imaging system 11L and the right imaging system 11R is within a predetermined acceptable range.

The focus position determination unit 48 of the present embodiment determines whether the focus positions in the imaging spaces of the imaging systems 11L and 11R are within the stereoscopic view possible range and closer than the optical axis intersection (hereinafter referred to as "cross point") of the photographing lenses 14L and 14R. More specifically, the focus position determination unit 48 determines whether the focus positions (the left imaging system focus position P1 and the right imaging system focus position P2) obtained by the AF search in the imaging systems 11L and 11R are between a cross point position CP of FIG. 7 and a stereoscopic view possible near point position Near described below.

Although depicted separately from the CPU 110 in FIG. 5, the stereoscopic view possible range calculation unit 42, the focus position determination unit 48, and the 3D image generation unit 150 may be constituted by the CPU 110.

Figure 6A:
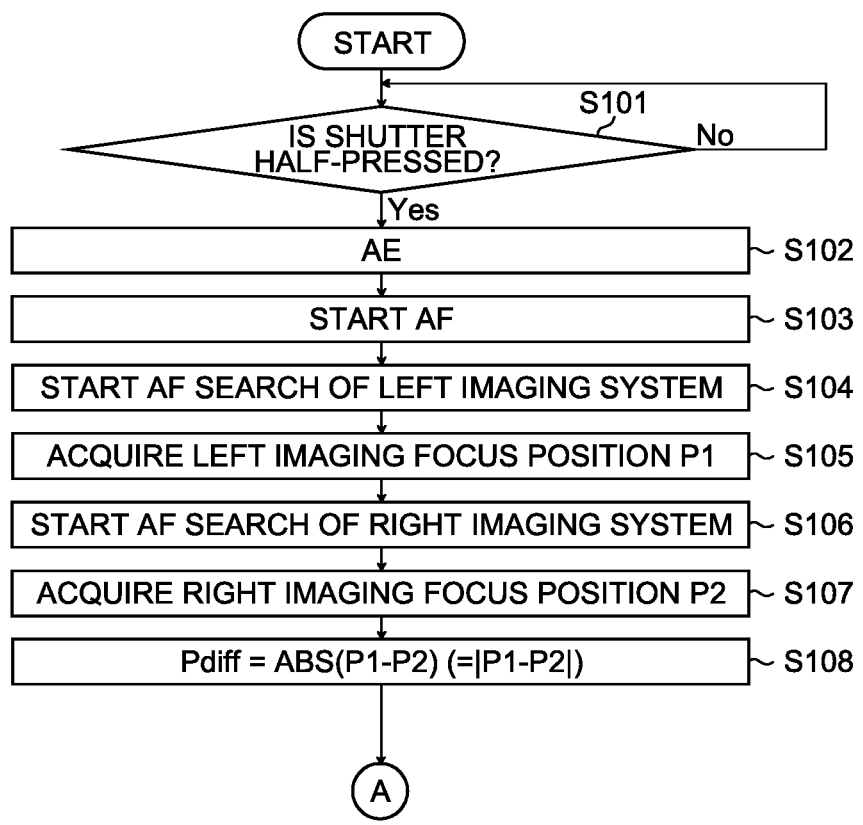
FIGS. 6A and 6B are flowcharts illustrating an example of a flow of a stereoscopic imaging control process according to the first embodiment.
Figure 6B:
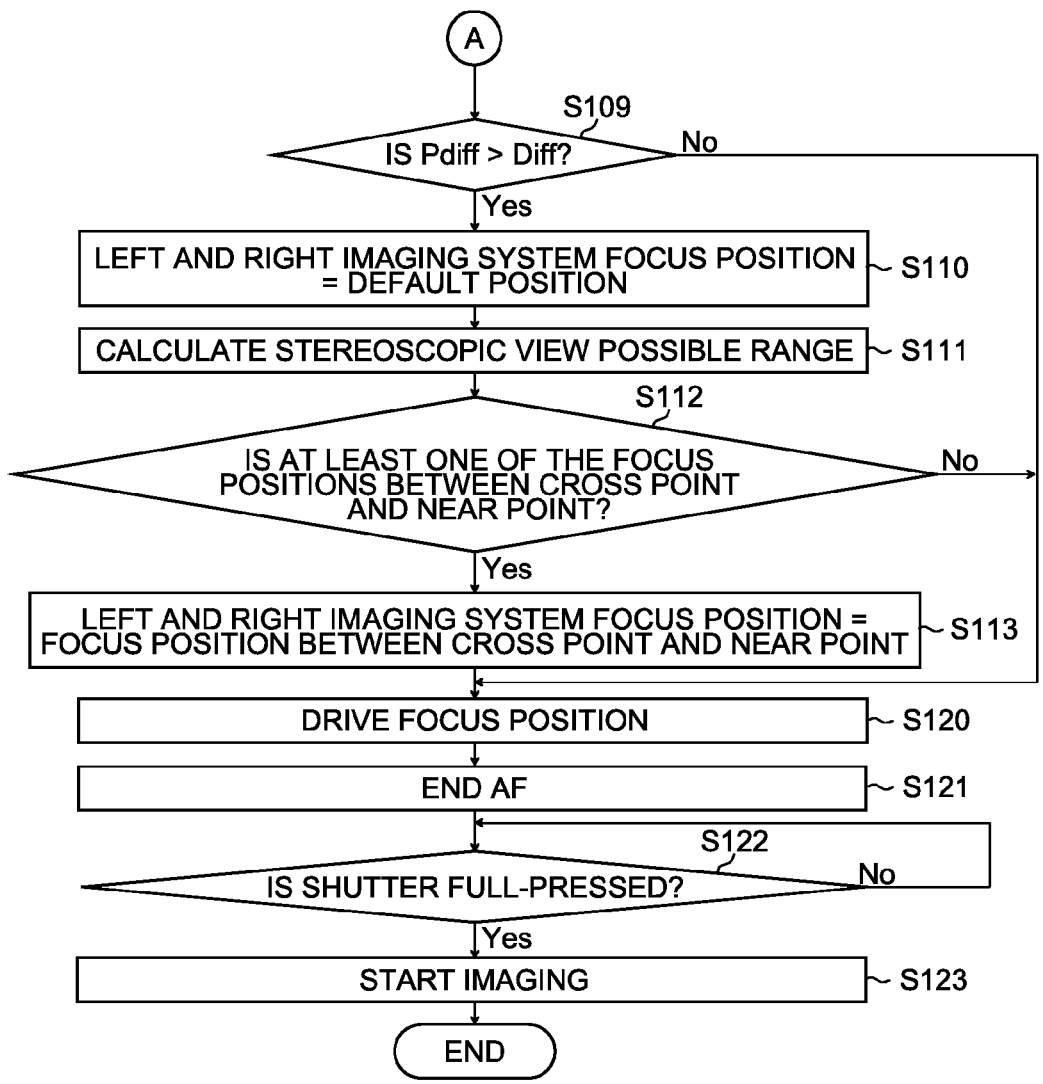

FIGS. 6A and 6B are flowcharts illustrating an example of a flow of a stereoscopic imaging control process according to the first embodiment. The CPU 110 of FIG. 5 executes the process in accordance with a program.

Figure 7:
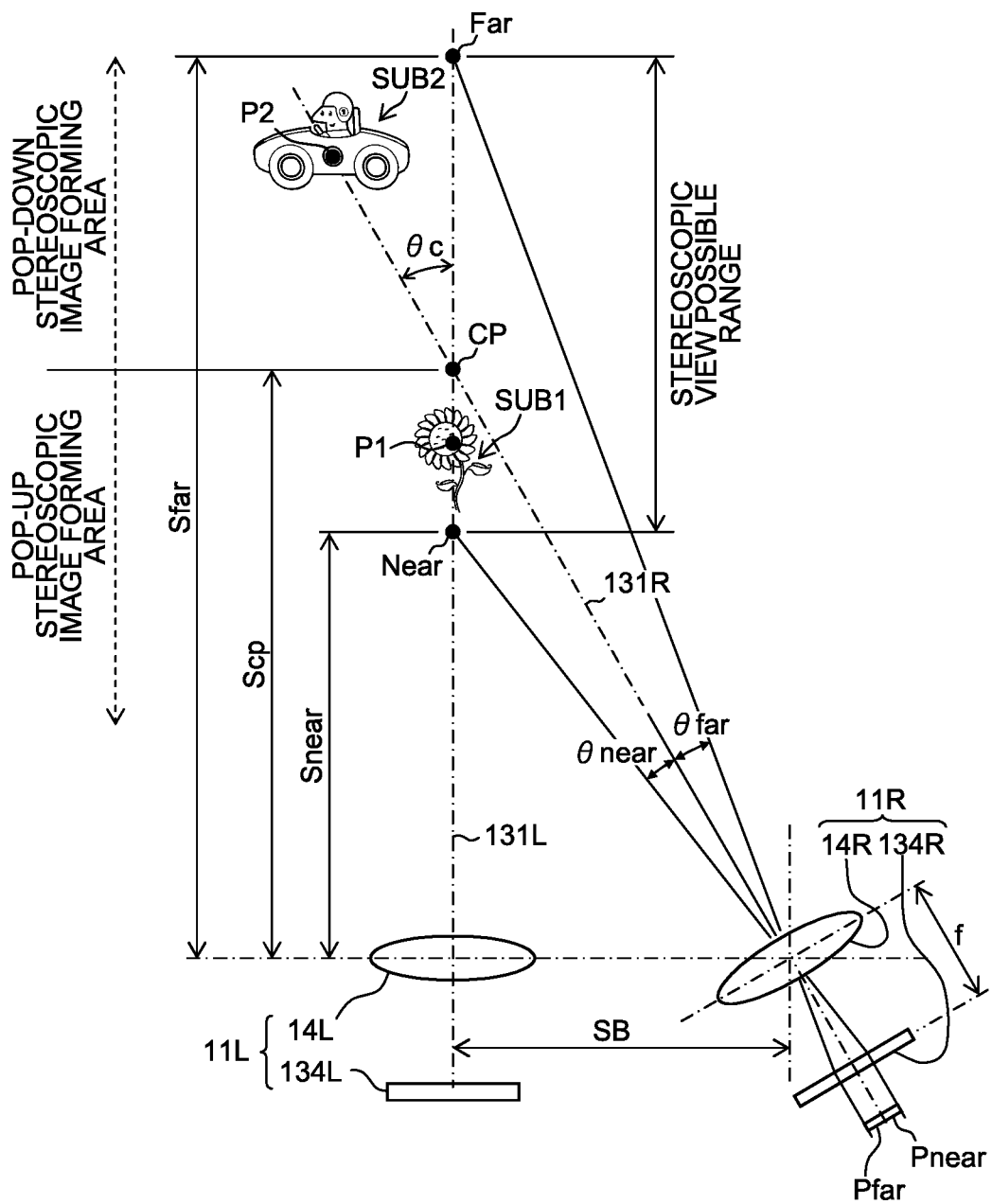
FIG. 7 is an explanatory diagram illustrating an example of an image space for explaining the first embodiment.
Figure 8A:
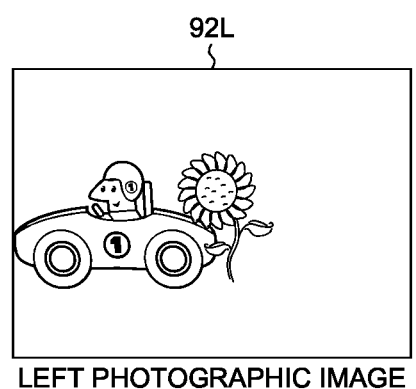
FIGS. 8A and 8B are explanatory diagrams illustrating an example of a photographic image in the imaging space.
Figure 8B:
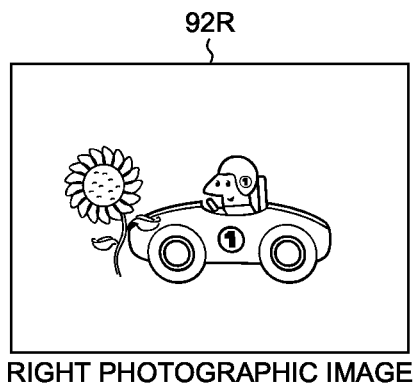
Figure 9:
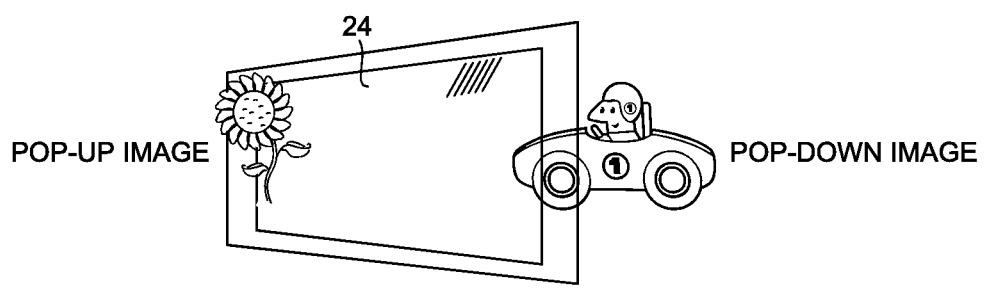
FIG. 9 is an explanatory diagram for explaining a pop-up image and a pop-down image.

Hereinafter, an example will be described in which 3D imaging is performed in the imaging space illustrated in FIG. 7, and the left photographic image 92L and the right photographic image 92R illustrated in FIGS. 8A and 8B are recorded in the memory card 156 as stereoscopic images. In this case, as schematically illustrated in FIG. 9, a flower SUB1 closer than the cross point position CP is stereoscopically displayed on the monitor 24 as a pop-up image, and a car SUB2 farther than the cross point position CP is stereoscopically displayed on the monitor 24 as a pop-down image.

In step S101, the CPU 110 determines whether the shutter button 18 is half-pressed. The process proceeds to step S102 if the shutter button 18 is half-pressed.

In step S102, the CPU 110 executes an AE (automatic exposure) process. Therefore, the CPU 110 performs photometry and sets the exposure.

In step S103, the CPU 110 starts an AF (automatic focus) process.

In step S104, the CPU 110 starts an AF search of the left imaging system 11L. More specifically, in the left imaging system 11L, the CPU 110 causes the AF detection unit 144 to calculate the focus evaluation value in the focus area at the center of the angle of view of the left photographic image 92L while causing the focus lens control unit 126L to move the focus lens 130FL along the optical axis 131L.

In step S105, the CPU 110 acquires the left imaging system focus position P1. More specifically, the CPU 110 detects the lens position (left imaging system focus lens position) of the focus lens 130FL where the focus evaluation value in the focus area of the left imaging system 11L is local maximum to acquire the focus position P1 (hereinafter referred to as "left imaging system focus position") in the imaging space corresponding to the lens position.

In step S106, the CPU 110 starts an AF search of the right imaging system 11R. More specifically, in the right imaging system 11R, the CPU 110 causes the AF detection unit 144 to calculate the focus evaluation value in the focus area at the center of the angle of view of the right photographic image 92R while causing the focus lens control unit 126R to move the focus lens 130FR along the optical axis 131R.

In step S107, the CPU 110 acquires the right imaging system focus position P2. More specifically, the CPU 110 detects the lens position (right imaging system focus lens position) of the focus lens 130FR where the focus evaluation value in the focus area of the right imaging system 11R is local maximum to acquire the focus position P2 (hereinafter referred to as "right imaging system focus position") in the imaging space corresponding to the lens position.

In step S108, the focus position determination unit 48 calculates a difference Pdiff (hereinafter referred to as "focus position difference") between the left imaging system focus position P1 and the right imaging system focus position P2. In FIG. 7, the position of the flower SUB1 on the optical axis 131L of the left imaging system 11L is indicated by P1, the position of the car SUB2 on the optical axis 131R of the right imaging system 11R is indicated by P2, and the difference between P1 and P2 (i.e. distance between P1 and P2) is indicated by Pdiff.

In step S109, the focus position determination unit 48 determines whether the focus position difference Pdiff is greater than a predetermined threshold Diff. If Pdiff is greater than Diff, the process proceeds to step S110. If Pdiff is equal to or smaller than Diff, the process proceeds to step S120.

In step S110, the focus position determination unit 48 initially sets a default position to a left and right imaging system focus position P3. For example, the left imaging system focus position P1 is used as the default position.

In step S111, the stereoscopic view possible range calculation unit 42 calculates a stereoscopic view possible range in the imaging space. In FIG. 7, an area between the stereoscopic view possible near point position "Near" and a stereoscopic view possible far point position "Far" is the stereoscopic view possible range. In the example, the stereoscopic view possible near point position Near and the stereoscopic view possible far point position Far in the imaging space are calculated based on a near point acceptable parallax amount Pnear, a far point acceptable parallax amount Pfar, a focus distance f, the cross point position CP, and the base length SB.

If the stereoscopic view possible parallax amount (referred to as "acceptable parallax amount") is expressed by a ratio relative to the width of the angle of view, the ratio is 3% on the near point side, and the ratios is 5% on the far point side, for example. The near point acceptable parallax amount Pnear and the far point acceptable parallax amount Pfar in FIG. 7 are indicated by distances from the optical axis 131R on the light receiving surface of the imaging element 134R. The focus distance f corresponds to the zoom positions (lens positions of the zoom lenses 130ZR and 130ZL), i.e. zoom magnifications of the photographing lenses 14L and 14R. Reference characters CP, Near, and Far can be expressed using a cross point distance Scp, a stereoscopic view possible near point distance Snear, and a stereoscopic view possible far point distance Sfar based on the photographing lens 14L. The base length SB is a distance between the photographing lenses 14L and 14R. In FIG. 7, θnear and θfar are expressed by [Expression 1], and Snear and Sfar are expressed by [Expression 2]. In FIG. 7, atan denotes arc tangent.

$$\theta near = atan(Pnear/f)$$

$$\theta far = atan(Pfar/f) \qquad \text{[Expression 1]}$$

$$Snear = SB \times tan(90° - atan(SB/Scp) - \theta near)$$

$$Sfar = SB \times tan(90° - atan(SB/Scp) - \theta far) \qquad \text{[Expression 2]}$$

Figure 10:
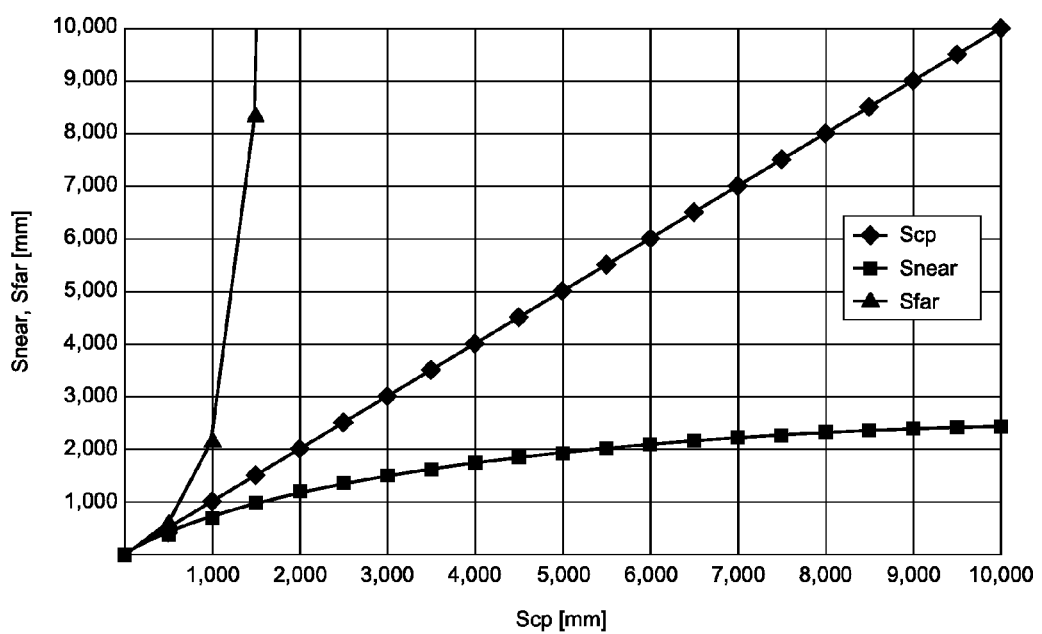
FIG. 10 is a graph illustrating a correspondence between a cross point and a stereoscopic view possible range.

The stereoscopic view possible range calculation unit 42, for example, sets the focus distance f as a variable parameter depending on the zooming operation of the zoom buttons 26 and sets other parameters Pnear, Pfar, SB, and Scp as fixed parameters to calculate Snear and Sfar in accordance with Expressions 1 and 2. Table information indicating the correspondence between the focus distance f, Snear, and Sfar can be used to acquire Snear and Sfar. The presently disclosed subject matter can also be applied if Pnear, Pfar, SB, and Scp are set as variable parameters. For example, a graph of FIG. 10 illustrates the relationship between Scp, Snear, and Sfar in a certain focus distance (wide end). Preparing the table information storing such a correspondence for each focus distance allows handling Scp as a variable parameter.

In step S112, the focus position determination unit 48 determines whether the focus position of at least one of the left imaging system focus position P1 and the right imaging system focus position P2 is between the cross point position CP and the stereoscopic view possible near point Near. In FIG. 7, the focus position P1 of the flower is between CP and Near, and the focus position P2 of the car is between CP and Far. In the case of FIG. 7, for example, a distance from the left photographing lens 14L to P1 (first subject distance) is compared with Scp and Snear, and a distance from the right photographing lens 14R to P2 (second subject distance) is compared with Scp×acos(θc) and Snear×acos(θc). By the way, θc denotes a convergence angle, and acos denotes arc cosine. The process proceeds to step S133 if at least one of the focus positions P1 and P2 is determined to be in the area between CP and Near. The process proceeds to step S120 if both focus positions are determined to be out of the area between CP and Near.

In step S113, the focus position determination unit 48 sets the focus position determined to be between the cross point position CP and the stereoscopic view possible near point Near among the two focus positions P1 and P2 as the left and right imaging system focus position P3. In the case of FIG. 7, the focus position P1 of the flower SUB1 that is between CP and Near is set as P3. If both P1 and P2 are between CP and Near, one of P1 and P2 that is closest to the stereoscopic view possible near point Near is set as P3.

In step S120, the CPU 110 causes the focus lens control units 126L and 126R to move the focus lens 130FL of the left imaging system 11L and the focus lens 130FR of the right imaging system 11R to lens positions corresponding to the left and right imaging system focus position P3. More specifically, the CPU 110 causes the focus lenses 130FL and 130FR to focus the subject (flower SUB1 in FIG. 7) located between the cross point position CP and the stereoscopic view possible near point Near.

In step S121, the CPU 110 waits for the completion of the focusing operations of the focus lens control units 126L and 126R.

In step S122, the CPU 110 determines whether the shutter button 18 is full-pressed. If the shutter button 18 is full-pressed, the process proceeds to step S123.

In step S123, imaging is started. More specifically, the left imaging system 11L and the right imaging system 11R take images of the subject, and the media control unit 154 records the obtained stereoscopic images (left photographic image 92L and right photographic image 92R) in the memory card 156.

Figure 11A:
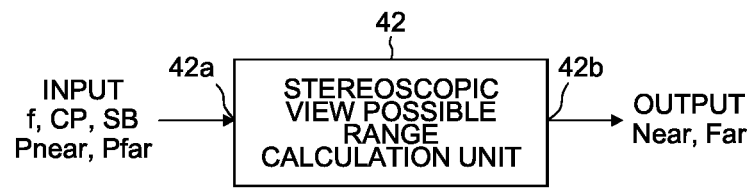
FIGS. 11A and 11B are explanatory views for explaining a case in which a stereoscopic view possible range calculation unit and a focus position determination unit are constituted by circuits.
Figure 11B:
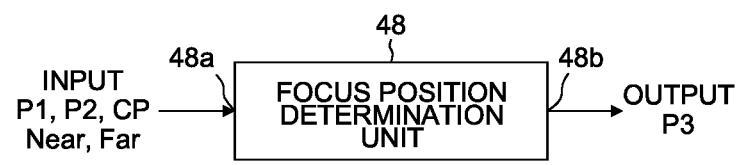

FIGS. 11A and 11B illustrate an example of a case in which the stereoscopic view possible range calculation unit 42 and the focus position determination unit 48 of the present embodiment are constituted by circuits.

The stereoscopic view possible range calculation unit 42 of FIG. 11A includes an input port 42a and an output port 42b. For example, when the focus distance f, the cross point position CP, the base length SB, the near point acceptable parallax amount Pnear, and the far point acceptable parallax amount Pfar are inputted to the input port 42a, the stereoscopic view possible range calculation unit 42 calculates the stereoscopic view possible near point position Near and the stereoscopic view possible far point position Far in the imaging space based on the inputted parameters f, CP, SB, Pnear, and Pfar and outputs Near and Far from the output port 42b. Reference characters CP, Near, and Far include values indicative of the cross point distance Scp, the stereoscopic view possible near point distance Snear, and the stereoscopic view possible far point distance Sfar of FIG. 7, respectively. Although the method of calculation is as described above, table information indicating the relationship between input and output may be stored in advance in the ROM 116 or the flash ROM 118, and Near and Far may be outputted based on the table information. Furthermore, as described, CP, SB, P, Pnear, and Pfar may be set as fixed parameters to skip the input.

The focus position determination unit 48 of FIG. 11B includes an input port 48a and an output port 48b. For example, when the left imaging system focus position P1, the right imaging system focus position P2, the cross point position CP, the stereoscopic view possible near point position Near, and the stereoscopic view possible far point position Far are inputted to the input port 48a, the focus position determination unit 48 determines the left and right imaging system focus position P3 from P1 and P2 based on the inputted parameters P1, P2, CP, Near, and Far and outputs P3 from the output port 48b. The parameters CP, Near, and Far include values indicating the cross point distance Scp, the stereoscopic view possible near point distance Snear, and the stereoscopic view possible far point distance Sfar of FIG. 7, respectively. Although the method of determination is as described above, table information indicative of the relationship between input and output may be stored in advance in the ROM 116 and the flash ROM 118, and P3 may be outputted based on the table information. Furthermore, CP may be set as a fixed parameter to skip the input. The parameters Near and Far outputted from the output port 42b of the stereoscopic view possible range calculation unit 42 are inputted.

(Second Embodiment)

Figure 12:
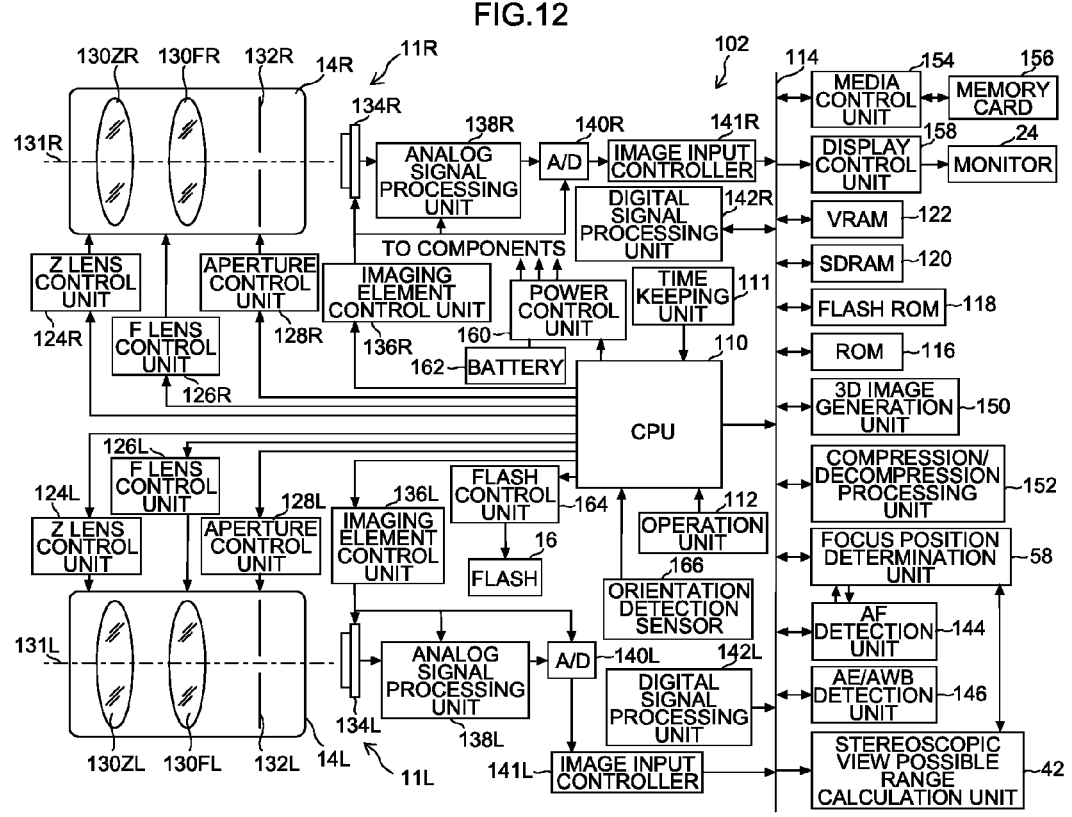
FIG. 12 is a block diagram illustrating an internal configuration of a digital camera according to a second embodiment.

FIG. 12 is a block diagram illustrating an internal configuration of a digital camera 102 according to a second embodiment. The same elements as in the digital camera 101 of the first embodiment illustrated in FIG. 5 are designated with the same reference numerals, and only items different from the first embodiment will be described.

A focus position determination unit 58 of the present embodiment determines whether the focus positions P1 and P2 are within the stereoscopic view possible range.

Although depicted separately from the CPU 110 in FIG. 12, the stereoscopic view possible range calculation unit 42 and the focus position determination unit 58 may be constituted by the CPU 110.

Figure 13A:
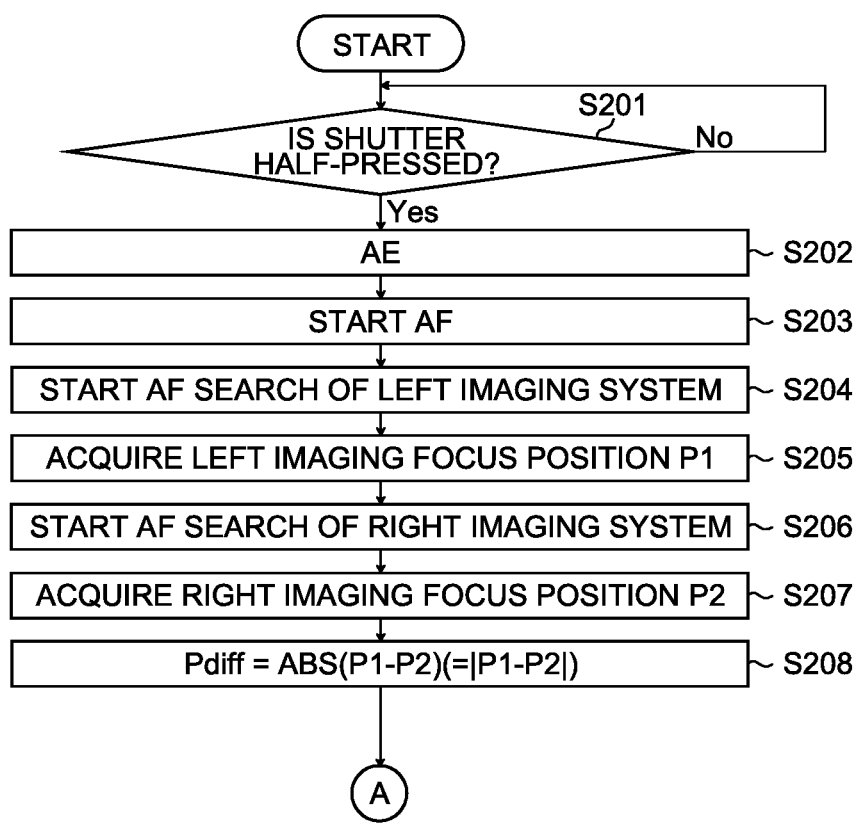
FIGS. 13A and 13B are flowcharts illustrating an example of a flow of a stereoscopic imaging control process according to the second embodiment.
Figure 13B:
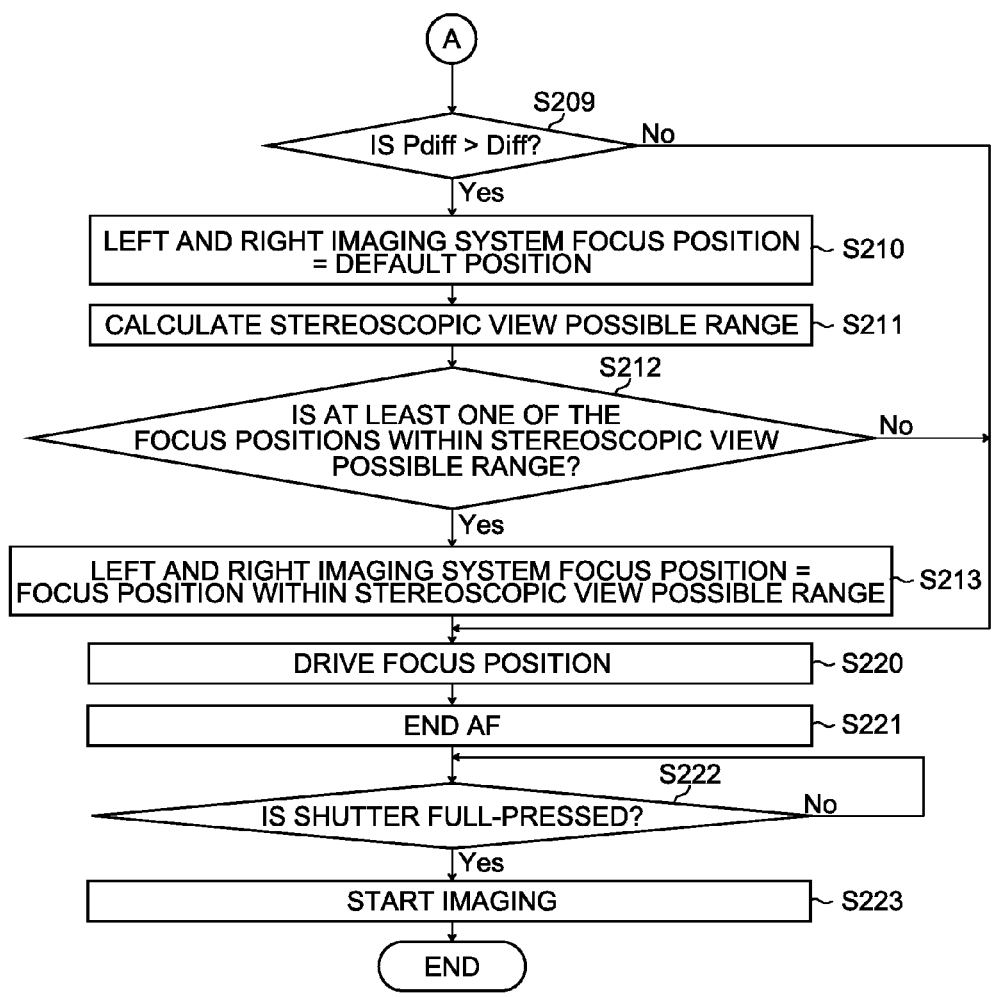

FIGS. 13A and 13B are flowcharts illustrating an example of a flow of a stereoscopic imaging control process according to the second embodiment. The CPU 110 of FIG. 12 executes the process in accordance with a program.

Figure 14:
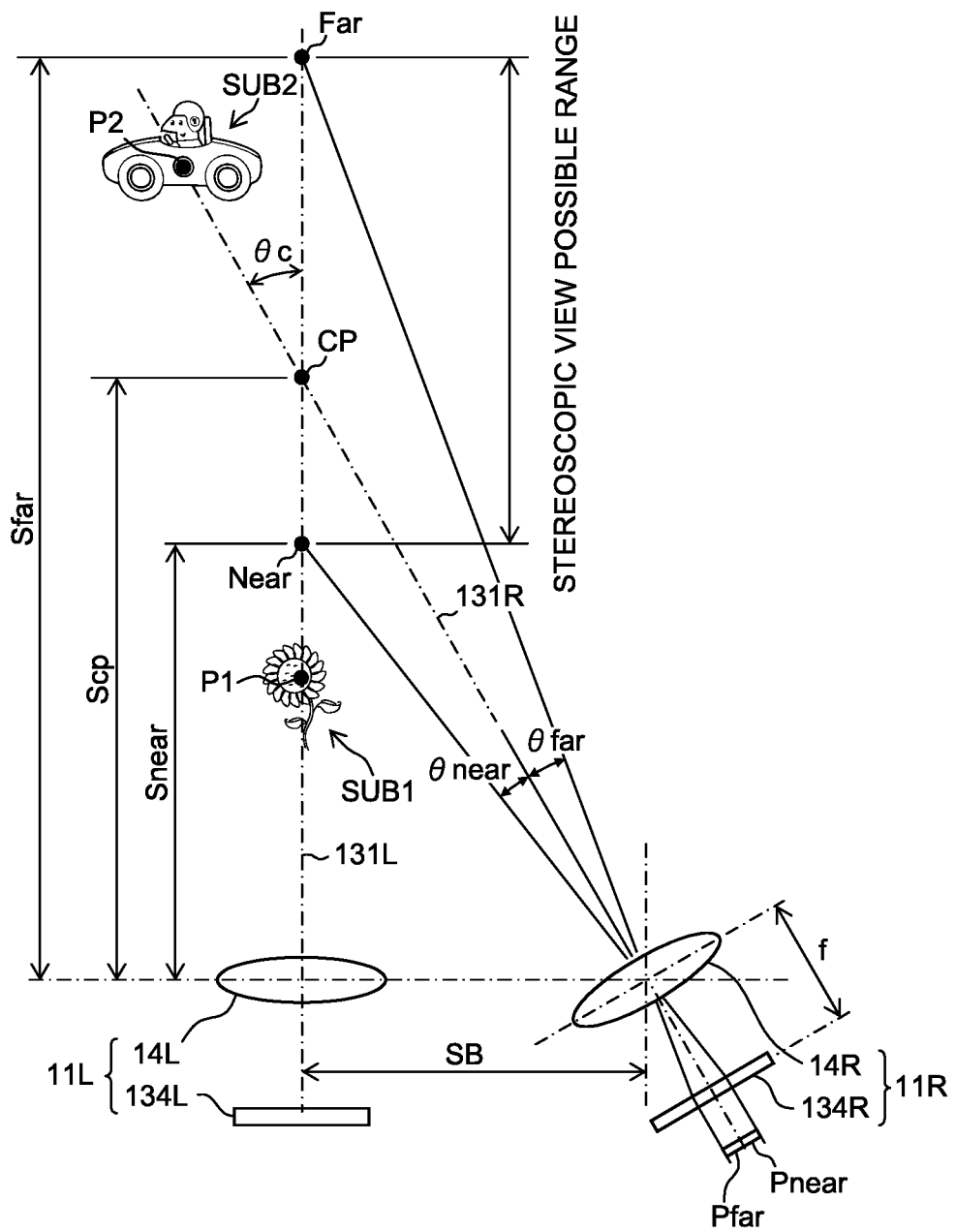
FIG. 14 is an explanatory diagram illustrating an example of an imaging space for explaining the second embodiment.

An example will be described in which stereoscopic view imaging is performed in the imaging space illustrated in FIG. 14, and the left photographic image 92L and the right photographic image 92R are recorded in the memory card 156 as stereoscopic images.

Steps S201 to S208 are similar to S101 to S108 in the first embodiment illustrated in FIGS. 6A and 6B, respectively, and the description will not be repeated.

In step S209, the focus position determination unit 58 determines whether the focus position difference Pdiff is greater than the threshold Diff. If Pdiff is greater than Diff, the process proceeds to step S210. If Pdiff is equal to or smaller than Diff, the process proceeds to step S220.

Steps S210 and S211 are the same as S110 and S111 of the first embodiment, respectively.

In step S212, the focus position determination unit 58 determines whether the focus position of at least one of the left imaging system focus position P1 and the right imaging system focus position P2 is within the stereoscopic view possible range. More specifically, the focus position determination unit 58 determines whether the focus positions P1 and P2 are between the stereoscopic view possible far point Far and the stereoscopic view possible near point Near and determines whether at least one of the focus positions is between Far and Near. In FIG. 14, P1 is at a position closer than Near, and P2 is between Far and Near. The process proceeds to step S213 if at least one of the focus positions is determined to be within the stereoscopic view possible range. The process proceeds to step S220 if both focus positions are determined to be not within the stereoscopic view possible range.

In step S213, the focus position determination unit 58 sets one of the focus positions P1 and P2 determined to be within the stereoscopic view possible range as the left and right imaging system focus position P3. In the case of FIG. 14, P1 that is between Near and Far is set as P3. If both P1 and P2 are between Near and Far, the focus position closest to the stereoscopic view possible near point Near among P1 and P2 is set as P3.

In step S220, the CPU 110 causes the focus lens control units 126L and 126R to move the focus lens 130FL of the left imaging system 11L and the focus lens 130FR of the right imaging system 11R to lens positions corresponding to the left and right imaging system focus position P3. Therefore, the CPU 110 causes the focus lenses 130FL and 130FR to focus the subject (car SUB2 in FIG. 14) in the stereoscopic view possible range.

Steps S221 to S223 are the same as S121 to S123 of the first embodiment, respectively.

Figure 15:
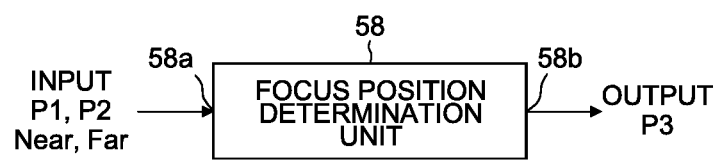
FIG. 15 is an explanatory diagram for explaining a case in which a focus position determination unit is constituted by a circuit.

FIG. 15 illustrates an example of the focus position determination unit 58 of the present embodiment is constituted by a circuit. In FIG. 15, the focus position determination unit 58 includes an input port 58a and an output port 58b. For example, when the left imaging system focus position P1, the right imaging system focus position P2, the stereoscopic view possible near point position Near (Snear), and the stereoscopic view possible far point position Far (Sfar) are inputted to an input port 58a, the focus position determination unit 58 determines the left and right imaging system focus position P3 from P1 and P2 based on the inputted parameters P1, P2, Near, and Far and outputs P3 from the output port 58b. Although the method of determination is as described, table information indicative of the relationship between input and output may be stored in advance in the ROM 116 or the flash ROM 118, and P3 may be outputted based on the table information.

(Third Embodiment)

Figure 16:
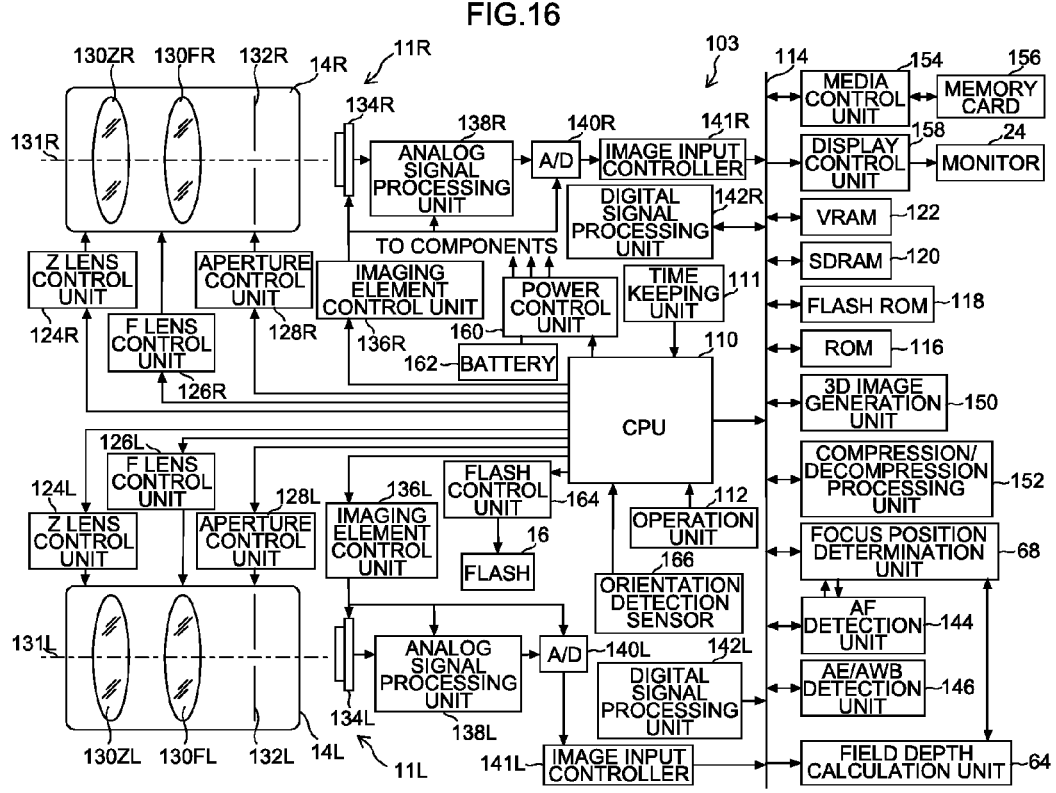
FIG. 16 is a block diagram illustrating an internal configuration of a digital camera according to a third embodiment.

FIG. 16 is a block diagram illustrating an internal configuration of a digital camera 103 according to a third embodiment. The same elements as in the digital camera 101 according to the first embodiment illustrated in FIG. 5 are designated with the same reference numerals, and only items different from the first embodiment will be described.

A field depth calculation unit 64 calculates depths of field (field depth) of the imaging systems 11L and 11R.

A focus position determination unit 68 of the present embodiment determines whether both the left imaging system focus position P1 and the right imaging system focus position P2 are included in the depths of field of the imaging systems 11L and 11R.

Although depicted separately from the CPU 110 in FIG. 16, the field depth calculation unit 64 and the focus position determination unit 68 may be constituted by the CPU 110.

Figure 17A:
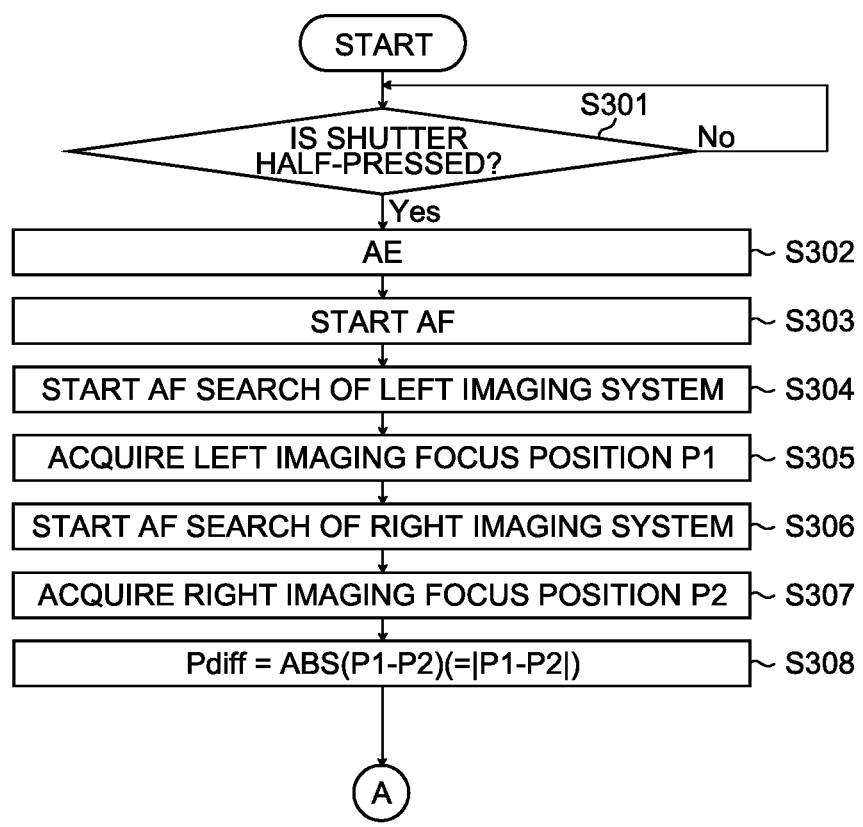
FIGS. 17A and 17B are flowcharts illustrating an example of a flow of a stereoscopic imaging control process according to the third embodiment.
Figure 17B:
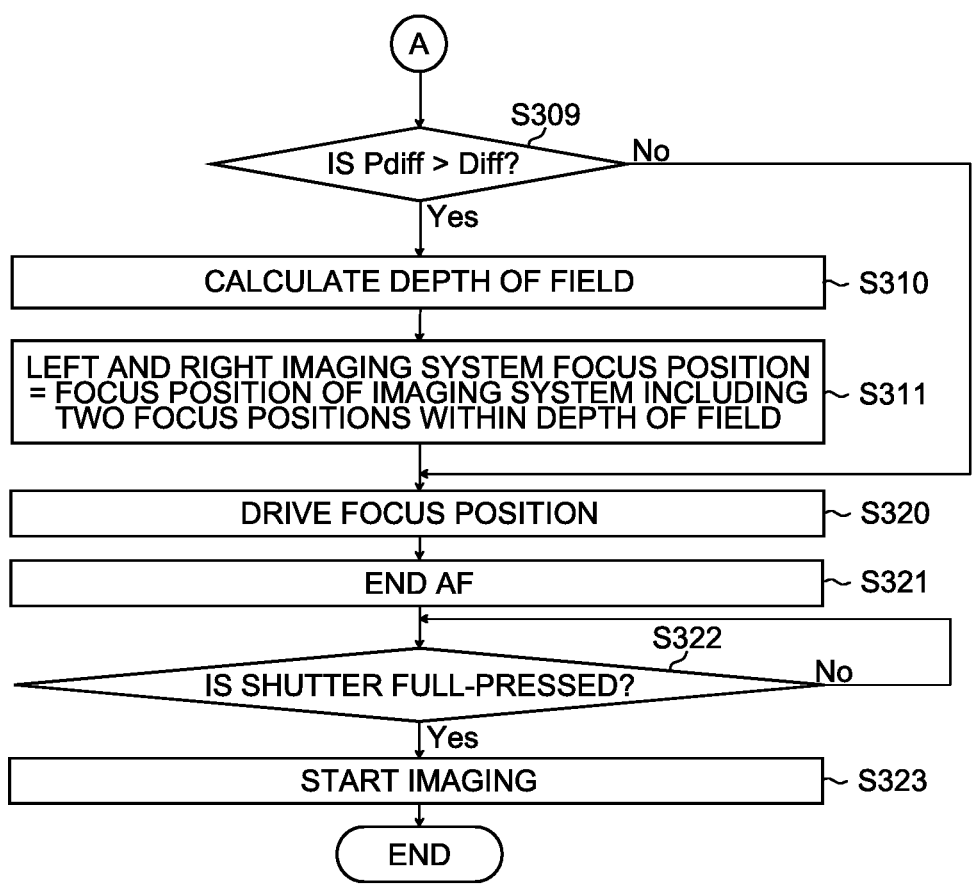

FIGS. 17A and 17B are flowcharts illustrating an example of a flow of a stereoscopic imaging process according to the third embodiment. The CPU 110 of FIG. 16 executes the process in accordance with a program.

Figure 18:
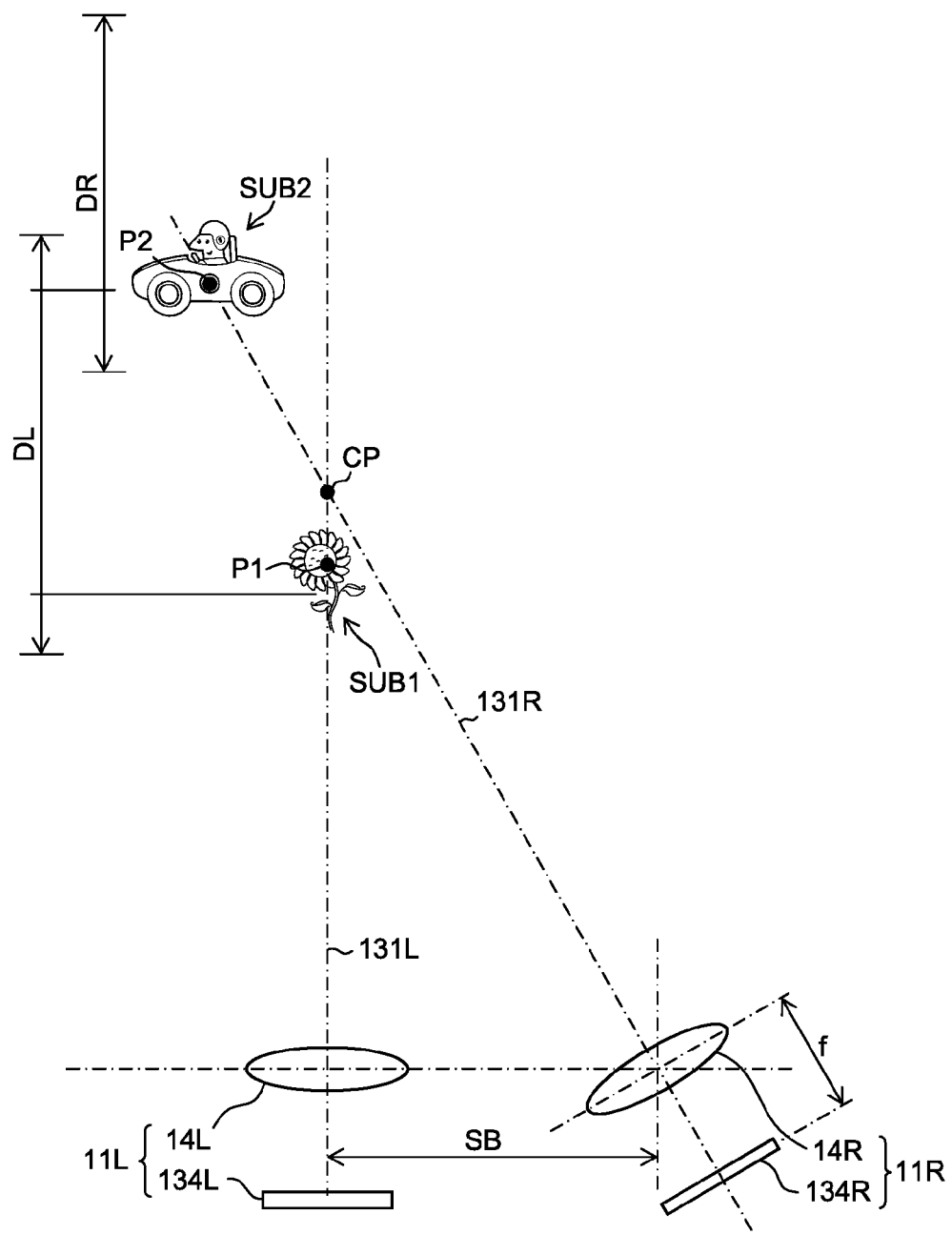
FIG. 18 is an explanatory diagram illustrating an example of an imaging space for explaining the third embodiment.

An example will be described in which stereoscopic view imaging is performed in the imaging space illustrated in FIG. 18, and the left photographic image 92L and the right photographic image 92R are recorded in the memory card 156 as stereoscopic images.

Steps S301 to S308 are the same as S101 to S108 according to the first embodiment illustrated in FIGS. 6A and 6B, respectively, and the description will not be repeated.

In step S309, the focus position determination unit 68 determines whether the focus position difference Pdiff is greater than the threshold Diff. The process proceeds to step S310 if Pdiff is greater than Diff. The process proceeds to step S320 if Pdiff is equal to or smaller than Diff.

In step S310, the field depth calculation unit 64 calculates the depths of field of the imaging systems 11L and 11R.

Assuming that H denotes hyperfocal distance, f denotes focus distance, N denotes aperture value, C denotes acceptable diameter of circle of confusion, Sp denotes distance to focus position, $D_N$ denotes near-side depth of field, and $D_F$ denotes far-side depth of field, a depth of field D can be calculated using Expressions 3 to 6.

$$H = f^2/(N \times C) \qquad \text{[Expression 3]}$$

$$D_N = (Sp \times (H-f))/(H+Sp-2f) \qquad \text{[Expression 4]}$$

$$D_F = (Sp \times (H-f))/(H-Sp) \qquad \text{[Expression 5]}$$

$$D = D_N + D_F \qquad \text{[Expression 6]}$$

The depth of field D of the left imaging system 11L will be designated with DL, and the depth of field D of the right imaging system 11R will be designated with DR. More specifically, DL denotes the depth of field of the left imaging system 11L when the focus lens 130FL is set at the lens position corresponding to the left imaging system focus position P1, and DR denotes the depth of field of the right imaging system 11R when the focus lens 130FR is set at the lens position corresponding to the right imaging system focus position P2. Therefore, the field depth calculation unit 64 calculates DL and DR.

In step S311, the focus position determination unit 68 determines whether both the left imaging system focus position P1 and the right imaging system focus position P2 are included in the depths of field (field depths) DL and DR of the imaging systems 11L and 11R, selects an imaging system, in which the depth of field includes both P1 and P2, and sets one of the focus positions (P1 or P2) detected by the AF search of the selected imaging system as the left and right imaging system focus position P3. In FIG. 18, the depth of field DL of the left imaging system 11L focusing on P1 includes both P1 and P2, while the depth of field DR of the right imaging system 11R focusing on P2 includes only P2. Therefore, the focus position determination unit 68 selects the left imaging system 11L and sets P1 as P3.

In step S320, the CPU 110 causes the focus lens control units 126L and 126R to move the focus lens 130FL of the left imaging system 11L and the focus lens 130FR of the right imaging system 11R to the lens positions corresponding to the left and right imaging system focus position P3. Therefore, the CPU 110 causes both the focus lenses 130FL and 130FR to focus on the focus position detected by the imaging system (11L or 11R) in which the depth of field includes both P1 and P2.

Steps S321 to S323 are the same as S121 to S123 of the first embodiment, respectively.

Figure 19:
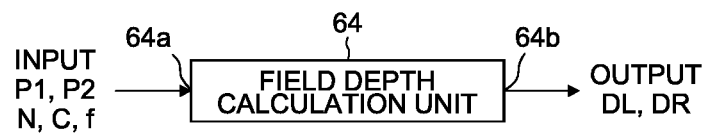
FIG. 19 is an explanatory diagram for explaining a case in which a field depth calculation unit is constituted by a circuit.

FIG. 19 illustrates an example of the field depth calculation unit 64 of the present embodiment which is constituted by a circuit. In FIG. 19, the field depth calculation unit 64 includes an input port 64a and an output port 64b. For example, when the left imaging system focus position P1 (Sp1), the right imaging system focus position P2 (Sp2), aperture values N of the apertures 132L and 132R, an acceptable diameter of circle of confusion C, and the focus distance f are inputted to the input port 64a, the field depth calculation unit 64 calculates the depths of field DL and DR based on the inputted parameters P1, P2, N, C, and f and outputs DL and DR from the output port 64b.

(Fourth Embodiment)

Figure 20:
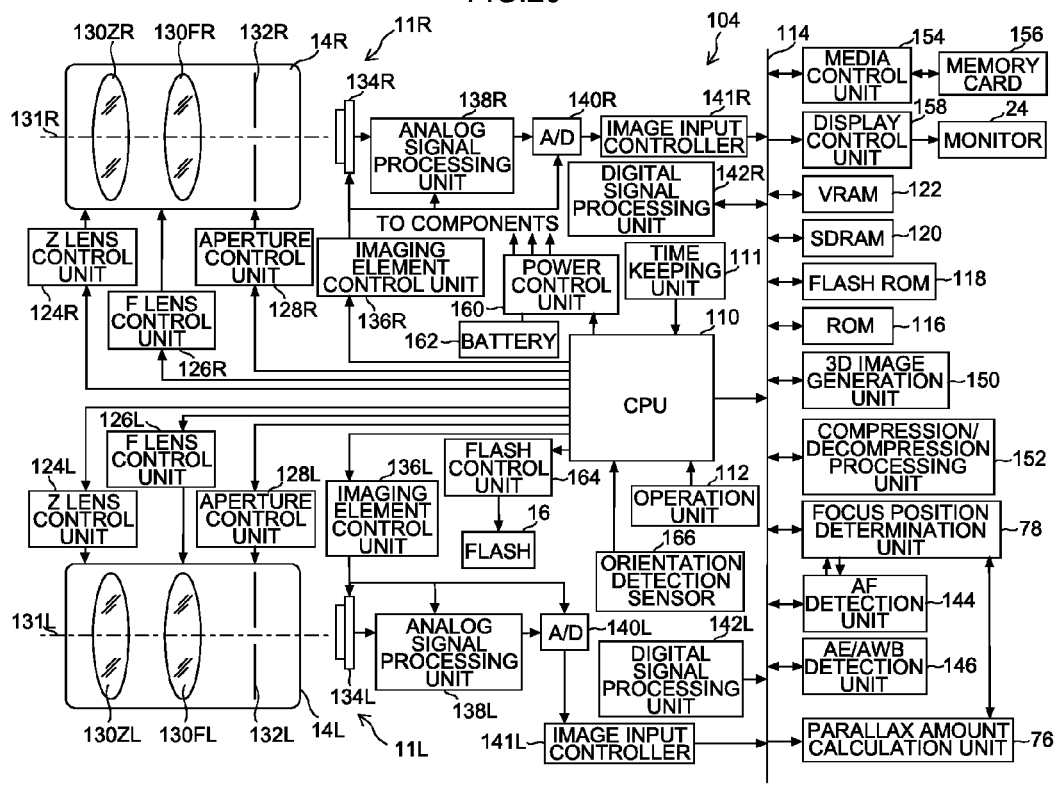
FIG. 20 is a block diagram illustrating an internal configuration of a digital camera according to a fourth embodiment.

FIG. 20 is a block diagram illustrating an internal configuration of the digital camera 104 according to a fourth embodiment. The same elements as in the digital camera 101 according to the first embodiment illustrated in FIG. 5 are designated with the same reference numerals, and only items different from the first embodiment will be described.

A parallax amount calculation unit 76 calculates a parallax amount of the left imaging system 11L and the right imaging system 11R for each of the focus positions P1 and P2.

A focus position determination unit 78 of the present embodiment compares the parallax amounts of the left imaging system focus position P1 and the right imaging system focus position P2 and determines the focus position with the smaller parallax amount between P1 and P2.

Although depicted separately from the CPU 110 in FIG. 20, the parallax amount calculation unit 76 and the focus position determination unit 78 may be constituted by the CPU 110.

Figure 21A:
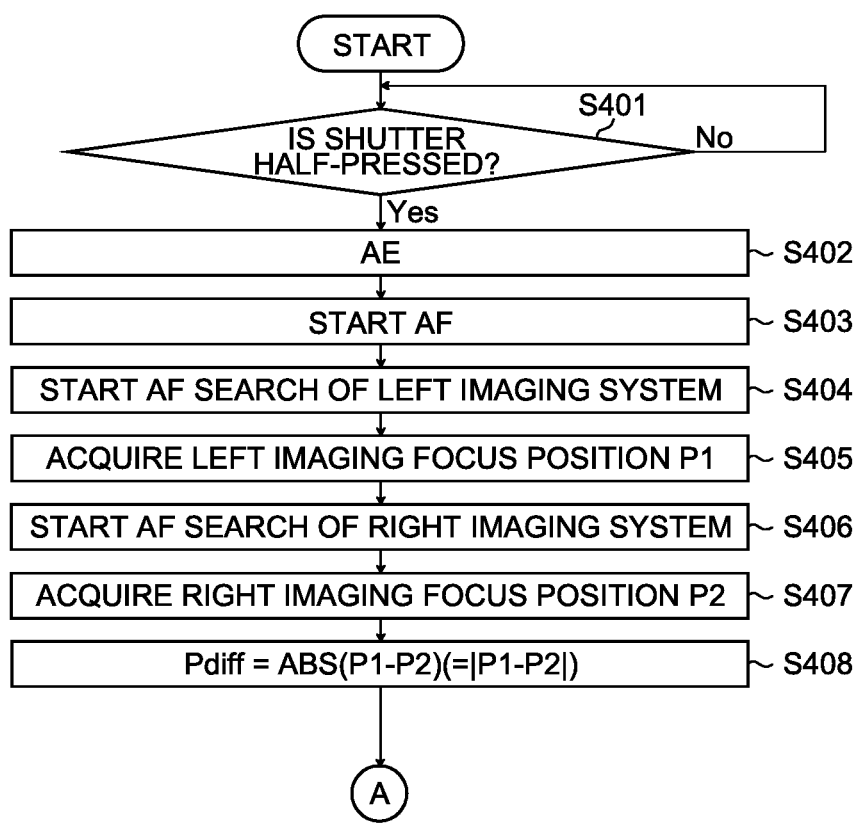
FIGS. 21A and 21B are flowcharts illustrating an example of a flow of a stereoscopic imaging control process according to the fourth embodiment.
Figure 21B:
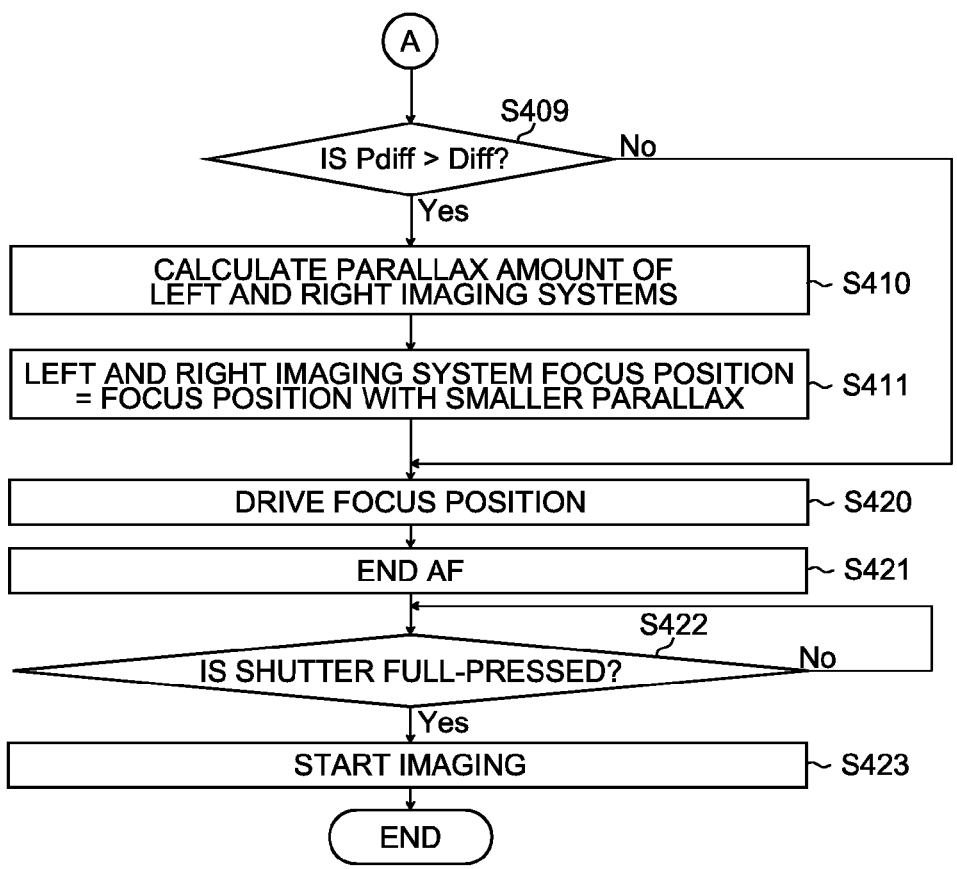

FIGS. 21A and 21B are flowcharts illustrating an example of a flow of a stereoscopic imaging process according to a fourth embodiment. The CPU 110 of FIG. 20 executes the process in accordance with a program.

Figure 22:
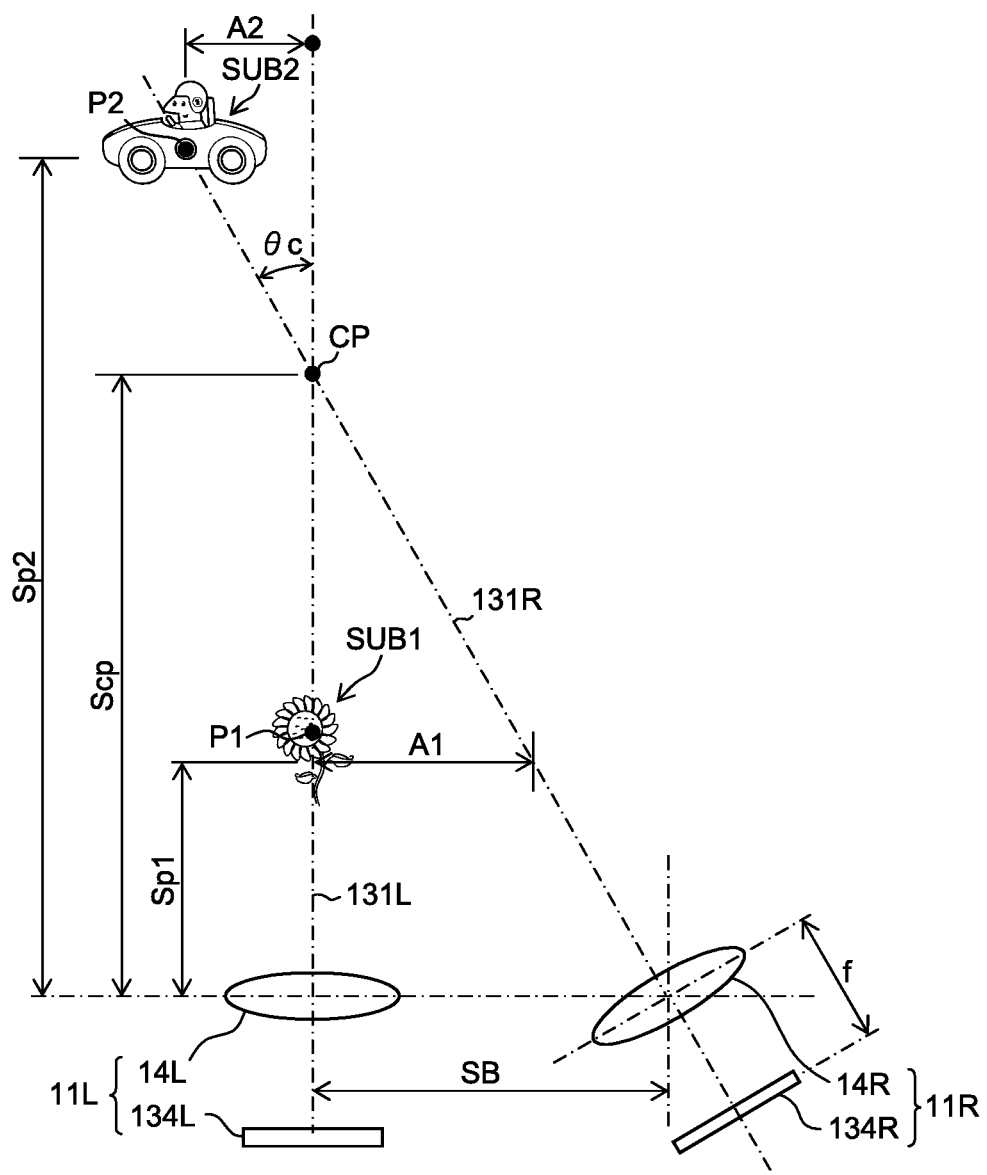
FIG. 22 is an explanatory diagram illustrating an example of an imaging space for explaining the fourth embodiment.
Figure 23A:
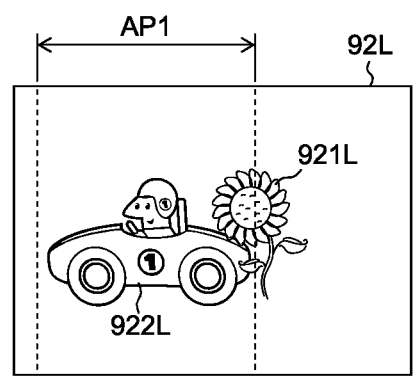
FIGS. 23A and 23B are explanatory diagrams for explaining a parallax amount.
Figure 23B:
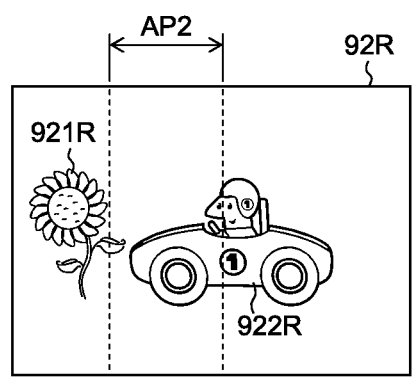

An example will be described in which stereoscopic view imaging is performed in the imaging space illustrated in FIG. 22, and the left photographic image 92L and the right photographic image 92R respectively illustrated in FIGS. 23A and 23B are recorded in the memory card 156 as stereoscopic images.

Steps S401 to S408 are respectively the same as S101 to S108 according to the first embodiment illustrated in FIG. 6A, and the description will not be repeated.

In step S409, the focus position determination unit 78 determines whether the focus position difference Pdiff is greater than the threshold Diff. The process proceeds to step S410 if Pdiff is greater than Diff. The process proceeds to step S420 if Pdiff is equal to or smaller than Diff.

In step S410, the parallax amount calculation unit 76 calculates the parallax amount of the left imaging system 11L and the right imaging system 11R for each of the focus positions P1 and P2. In the present embodiment, a parallax amount A1 of the left imaging system focus position P1 and a parallax amount A2 of the right imaging system focus position P2 are calculated based on the left imaging system focus position P1, the right imaging system focus position P2, the cross point position CP, and the base length SB. Reference numerals A1 and A2 denote parallax amounts between the imaging systems 11L and 11R in the imaging space. As illustrated in FIG. 22, when the subject distance to P1 is designated with Sp1, the subject distance to P2 is designated with Sp2, and the distance to CP is designated with Scp, A1 and A2 can be calculated using [Expression 7].

$$A1=((Scp/SB)\times(Scp-Sp1))$$

$$A2=((Scp/SB)\times(Sp2-Scp)) \qquad \text{[Expression 7]}$$

Reference character A1 is proportional to a binocular parallax amount AP1 of a flower image 921L of the left photographic image 92L and a flower image 921R of the right photographic image 92R in FIGS. 23A and 23B. Reference character A2 is proportional to a binocular parallax amount AP2 of a car image 922L of the left photographic image 92L and a car image 922R of the right photographic image 92R in FIGS. 23A and 23B. Reference characters AP1 and AP2 are parallax amounts between both eyes in the photographic image. Therefore, it can also be stated that the parallax amount calculation unit 76 detects the binocular parallax amounts AP1 and AP2 in the photographic image for each of the focus positions P1 and P2.

In step S411, the focus position determination unit 78 compares the parallax amounts A1 and A2 at the left imaging system focus position P1 and the right imaging system focus position P2, determines the focus position with the smaller parallax amount between P1 and P2, and sets the focus position as the left and right imaging system focus position P3.

In step S420, the CPU 110 causes the focus lens control units 126L and 126R to move the focus lens 130FL of the left imaging system 11L and the focus lens 130FR of the right imaging system 11R to the lens positions corresponding to the left and right imaging system focus position P3. Therefore, the CPU 110 causes the focus lenses 130FL and 130FR to focus on the focus position with the smaller parallax amount between P1 and P2.

Steps S421 to S423 are the same as S121 to S123 of the first embodiment, respectively.

Figure 24:
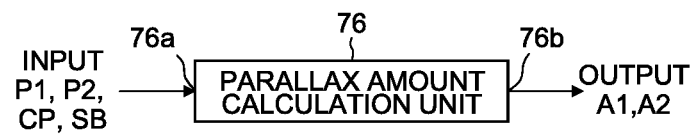
FIG. 24 is an explanatory diagram for explaining a case in which a parallax amount calculation unit is constituted by a circuit.

FIG. 24 illustrates an example the parallax amount calculation unit 76 of the present embodiment which is constituted by a circuit. In FIG. 24, the parallax amount calculation unit 76 includes an input port 76a and an output port 76b. For example, when the left imaging system focus position P1 (Sp1), the right imaging system focus position P2 (Sp2), the cross point position CP (Scp), and the base length SB are inputted to the input port 76a, the parallax amount calculation unit 76 calculates the parallax amounts A1 and A2 based on the inputted parameters P1, P2, CP, and SB and outputs A1 and A2 from the output port 76b.

(Fifth Embodiment)

Figure 25:
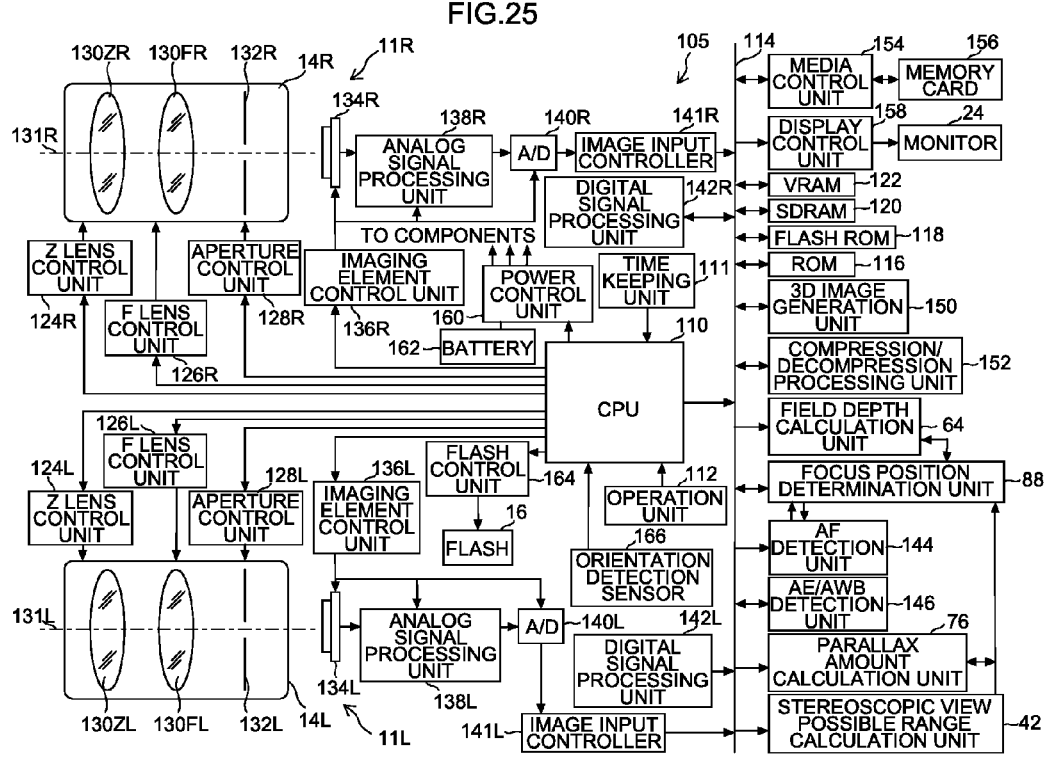
FIG. 25 is a block diagram illustrating an internal configuration of a digital camera according to a fifth embodiment.

FIG. 25 is a block diagram illustrating an internal configuration of a digital camera 105 according to a fifth embodiment. The same elements as in the digital cameras (101 of FIG. 5, 102 of FIG. 12, 103 of FIGS. 16, and 104 of FIG. 20) of the first to fourth embodiments are designated with the same reference numerals, and only different items will be described.

A focus position determination unit 88 determines whether the focus positions P1 and P2 are in the stereoscopic view possible range (first focus position determination). The focus position determination unit 88 also determines whether both the left imaging system focus position P1 and the right imaging system focus position P2 are included in the depths of field of the imaging systems 11L and 11R (second focus position determination). The focus position determination unit 88 also determines the size relationship between the parallax amount at the left imaging system focus position P1 and the parallax amount at the right imaging system focus position P2 (third focus position determination). The focus position determination unit 88 selects one of the first focus position and the second focus position based on the results of the first to third focus position determinations. More specifically, the focus position determination unit 88 of the present embodiment selects the left and right imaging system focus position P3 from P1 and P2 based on the left imaging system focus position P1, the right imaging system focus position P2, the stereoscopic view possible range, the depth of field, and the parallax amounts at P1 and P2.

Figure 26A:
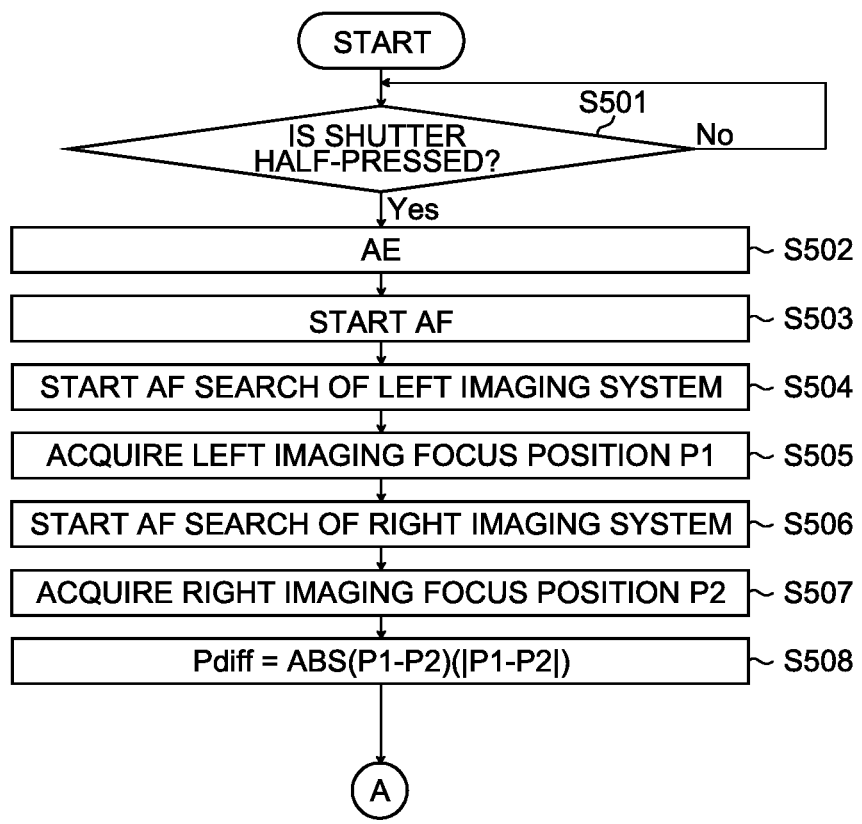

FIGS. 26A and 26B are flowcharts illustrating an example of a flow of a stereoscopic imaging process according to the fifth embodiment. The CPU 110 of FIG. 25 executes the process in accordance with a program.

Steps S501 to S508 are the same as S101 to S108 according to the first embodiment illustrated in FIGS. 6A, respectively, and the description will not be repeated.

In step S509, the focus position determination unit 88 determines whether the focus position difference Pdiff is greater than the threshold Diff. The process proceeds to step S510 if Pdiff is greater than Diff. The process proceeds to step S520 if Pdiff is equal to or smaller than Diff.

In step S510, the field depth calculation unit 64 calculates the depths of field DL and DR of the imaging systems 11L and 11R in the same way as in step S310 of the third embodiment. More specifically, the field depth calculation unit 64 calculates the depth of field DL of the left imaging system 11L in a state in which the focus lens 130FL of the left imaging system 11L focuses on the left imaging system focus position P1 and the depth of field DR of the right imaging system 11R in a state in which the focus lens 130FR of the right imaging system 11R focuses on the right imaging system focus position P2.

In step S511, whether both the left imaging system focus position P1 and the right imaging system focus position P2 are included in the depths of field DL and DR of the imaging systems 11L and 11R is determined as in step S311 of the third embodiment.

In step S512, the parallax amount of the left imaging system 11L and the right imaging system 11R is calculated for each of the focus positions P1 and P2 as in step S410 of the fourth embodiment.

In step S513, the size relationship between the parallax amount at the left imaging system focus position P1 and the parallax amount at the right imaging system focus position P2 is determined as in step S411 of the fourth embodiment.

In step S514, the stereoscopic view possible range in the imaging space is calculated as in step S211 of the second embodiment.

In step S515, whether the focus positions P1 and P2 are within the stereoscopic possible range is determined as in step S212 of the second embodiment.

In step S517, the left and right imaging system focus position P3 (focus position at imaging) is determined based on a determination table of focus position at imaging.

FIG. 27 illustrates an example of the determination table of focus position at imaging. In the example, if at least one of P1 and P2 is in the stereoscopic view possible range, the focus position in the stereoscopic view possible range is selected as the focus position at imaging P3 as in the second embodiment. If both P1 and P2 are out of the stereoscopic view possible range, one of the focus positions with the smaller parallax amount is selected as P3. If both P1 and P2 are within the stereoscopic view possible range, one of the focus position detected by the imaging system including both the focus positions P1 and P2 in the depth of field is selected as P3.

FIG. 28 illustrates another example of the determination table of focus position at imaging. In the example, if at least one of P1 and P2 is in the stereoscopic view possible range, the focus position in the stereoscopic view possible range is selected as the focus position at imaging P3 as in the second embodiment. If both P1 and P2 are out of the stereoscopic view possible range, one of the focus positions detected by the imaging system including both the focus positions P1 and P2 in the depth of field is selected as P3. If both P1 and P2 are within the stereoscopic view possible range, the focus position with the smaller parallax amount is selected as P3.

The presently disclosed subject matter is not particularly limited to the cases illustrated in FIGS. 27 and 28. For example, the focus position with the smaller parallax amount may be selected as P3 if both P1 and P2 are out of the stereoscopic view possible range and/or if both P1 and P2 are within the stereoscopic view possible range. Furthermore, for example, one of the focus positions detected by the imaging system including both the focus positions P1 and P2 in the depth of field may be selected as P3 if both P1 and P2 are out of the stereoscopic view possible range and/or if both P1 and P2 are within the stereoscopic view possible range.

In step S520, the CPU 110 causes the focus lens control units 126L and 126R to move the focus lens 130FL of the left imaging system 11L and the focus lens 130FR of the right imaging system 11R to the lens positions corresponding to the left and right imaging system focus position P3.

Steps S521 to S523 are the same as S121 to S123 of the first embodiment, respectively.

Examples have been described in which the position (focus position) of the subject, on which the focus lenses focus in a specific focus area in the angle of view, is detected by detecting the focus lens positions where the contrast of photographic image is local maximum. However, the presently disclosed subject matter is not limited to such cases. For example, the presently disclosed subject matter can be applied to a case of measuring the subject distance using a distance measurement sensor.

The presently disclosed subject matter can be provided as a computer-readable program code for causing a device (such as an electronic camera, an electronic stereoscopic camera or a computer which is connected thereto) to execute the above described process, a computer-readable recording medium on which the computer-readable program code is stored or a computer program product including the computer-readable program code.

The presently disclosed subject matter is not limited to the examples described in the present specification or to the examples illustrated in the drawings. It is obvious that various design changes and modifications can be made without departing from the scope of the presently disclosed subject matter.

What is claimed is:

1. A stereoscopic imaging apparatus comprising:
a first imaging device configured to include a first imaging optical system with a first focus lens and to image a subject to generate a first image;
a second imaging device configured to include a second imaging optical system with a second focus lens and to image the subject to generate a second image;
a lens driving device configured to move the first and second focus lenses along a first optical axis of the first imaging optical system and a second optical axis of the second imaging optical system, respectively;

a focus position detection device configured to detect a first focus position in an imaging space of the first focus lens and a second focus position in an imaging space of the second focus lens;

a stereoscopic view possible range calculation device configured to calculate a stereoscopic view possible range where a parallax amount of the first imaging device and the second imaging device is within an acceptable range;

a focus position determination device configured to determine whether the focus positions are within the stereoscopic view possible range; and a focus control device configured to cause the first focus lens and the second focus lens to focus on one focus position of the first focus position and the second focus position without adjusting a convergence angle formed by the first and second optical axes when the first focus position and the second focus position are different from each other, said one focus position determined to be within the stereoscopic view possible range.

2. A stereoscopic imaging apparatus comprising:

a first imaging device configured to include a first imaging optical system with a first focus lens and to image a subject to generate a first image;

a second imaging device configured to include a second imaging optical system with a second focus lens and to image the subject to generate a second image;

a lens driving device configured to move the first and second focus lenses along a first optical axis of the first imaging optical system and a second optical axis of the second imaging optical system, respectively;

a focus position detection device configured to detect a first focus position in an imaging space of the first focus lens and a second focus position in an imaging space of the second focus lens;

a field depth calculation device configured to calculate depths of field of the imaging devices;

a focus position determination device configured to determine whether both the first focus position and the second focus position are included in the depths of field of the imaging devices; and a focus control device configured to cause the first focus lens and the second focus lens to focus on one of the focus positions detected by the imaging device without adjusting a convergence angle formed by the first and second optical axes when the first focus position and the second focus position are different from each other, the depth of field of which includes both the first focus position and the second focus position.

3. A stereoscopic imaging apparatus comprising:

a first imaging device configured to include a first imaging optical system with a first focus lens and to image a subject to generate a first image;

a second imaging device configured to include a second imaging optical system with a second focus lens and to image the subject to generate a second image;

a lens driving device configured to move the first and second focus lenses along a first optical axis of the first imaging optical system and a second optical axis of the second imaging optical system, respectively;

a focus position detection device configured to detect a first focus position in an imaging space of the first focus lens and a second focus position in an imaging space of the second focus lens;

a parallax amount calculation device configured to calculate a parallax amount of the first imaging device and the second imaging device for each of the focus positions;

a focus position determination device configured to determine the focus position with the smaller parallax amount from among the first focus position and the second focus position; and a focus control device configured to cause the first focus lens and the second focus lens to focus on the focus position determined by the focus position determination device to have the smaller parallax amount without adjusting a convergence angle formed by the first and second optical axes when the first focus position and the second focus position are different from each other.

4. A stereoscopic imaging apparatus comprising:

a first imaging device configured to include a first imaging optical system with a first focus lens and to image a subject to generate a first image;

a second imaging device configured to include a second imaging optical system with a second focus lens and to image the subject to generate a second image;

a lens driving device configured to move the first and second focus lenses along a first optical axis of the first imaging optical system and a second optical axis of the second imaging optical system, respectively;

a focus position detection device configured to detect a first focus position in an imaging space of the first focus lens and a second focus position in an imaging space of the second focus lens;

a stereoscopic view possible range calculation device configured to calculate a stereoscopic view possible range where a parallax amount of the first imaging device and the second imaging device is within an acceptable range;

a field depth calculation device configured to calculate depths of field of the imaging devices;

a parallax amount calculation device configured to calculate the parallax amount of the first imaging device and the second imaging device for each of the focus positions;

a focus position selection device configured to select one focus position from among the first focus position and the second focus position based on the first focus position, the second focus position, the stereoscopic view possible range, the depths of field, and the parallax amounts; and a focus control device configured to cause the lens driving device to focus the first focus lens and the second focus lens on the selected focus position without adjusting a convergence angle formed by the first and second optical axes when the first focus position and the second focus position are different from each other.

5. The stereoscopic imaging apparatus according to claim 1, further comprising a field depth calculation device configured to calculate depths of field of the imaging devices, wherein the focus position determination device determines whether both the first focus position and the second focus position are included in the depths of field of the imaging devices, and the focus control device causes the first focus lens and the second focus lens to focus on one of the focus positions detected by the imaging device, the depth of field of which includes both the first focus position and the second focus position in the depth of field if both the first focus position and the second focus position are within the stereoscopic view possible range.

6. The stereoscopic imaging apparatus according to claim 1, further comprising a parallax amount acquisition device configured to acquire parallax amounts of the focus positions in the first image and the second image, wherein the focus control device causes the first focus lens and the second focus lens to focus on one of the first focus position and the second focus position with the smaller parallax amount if both the first focus position and the second focus position are within the stereoscopic view possible range.

7. A stereoscopic imaging apparatus comprising:

a first imaging device configured to include a first imaging optical system with a first focus lens and to image a subject to generate a first image;

a second imaging device configured to include a second imaging optical system with a second focus lens and to image the subject to generate a second image;

a lens driving device configured to move the first and second focus lenses along a first optical axis of the first imaging optical system and a second optical axis of the second imaging optical system, respectively;

a focus position detection device configured to detect a first focus position in an imaging space of the first focus lens and a second focus position in an imaging space of the second focus lens;

a stereoscopic view possible range calculation device configured to calculate a stereoscopic view possible range where a parallax amount of the first imaging device and the second imaging device is within an acceptable range;

a field depth calculation device that calculates depths of field of the imaging devices;

a focus position determination device configured to determine whether the focus positions are within the stereoscopic view possible range and whether both the first focus position and the second focus position are included in the depths of field of the imaging devices; and a focus control device configured to cause the first focus lens and the second focus lens to focus on one of the focus positions detected by the imaging device without adjusting a convergence angle formed by the first and second optical axes when the first focus position and the second focus position are different from each other, the depth of field of which includes both the first focus position and the second focus position in the depth of field if both the first focus position and the second focus position are out of the stereoscopic view possible range.

8. A stereoscopic imaging apparatus comprising:

a first imaging device configured to include a first imaging optical system with a first focus lens and to image a subject to generate a first image;

a second imaging device configured to include a second imaging optical system with a second focus lens and to image the subject to generate a second image;

a lens driving device configured to move the first and second focus lenses along a first optical axis of the first imaging optical system and a second optical axis of the second imaging optical system, respectively;

a focus position detection device configured to detect a first focus position in an imaging space of the first focus lens and a second focus position in an imaging space of the second focus lens;

a stereoscopic view possible range calculation device configured to calculate a stereoscopic view possible range where a parallax amount of the first imaging device and the second imaging device is within an acceptable range;

a focus position determination device configured to determine whether the focus positions are within the stereoscopic view possible range;

a parallax amount acquisition device configure to acquire parallax amounts of the focus positions in the first image and the second image; and a focus control device configured to cause the first focus lens and the second focus lens to focus on one of the first focus position and the second focus position with the smaller parallax amount if both the first focus position and the second focus position are out of the stereoscopic view possible range.

9. The stereoscopic imaging apparatus according to claim 1, wherein the focus position determination device determines whether the focus positions are between an intersection of the optical axes of the imaging optical systems and a near point of the stereoscopic view possible range, and the focus control device causes the first focus lens and the second focus lens to focus on one of the first focus position and the second focus position determined to be between the intersection and the near point of the stereoscopic view possible range.

10. A stereoscopic imaging apparatus comprising:

a first imaging device configured to include a first imaging optical system with a first focus lens and to image a subject to generate a first image;

a second imaging device configured to include a second imaging optical system with a second focus lens and to image the subject to generate a second image;

a lens driving device configured to move the first and second focus lenses along a first optical axis of the first imaging optical system and a second optical axis of the second imaging optical system, respectively;

a focus position detection device configured to detect a first focus position in an imaging space of the first focus lens and a second focus position in an imaging space of the second focus lens;

a stereoscopic view possible range calculation device configured to calculate a stereoscopic view possible range where a parallax amount of the first imaging device and the second imaging device is within an acceptable range;

a focus position determination device configured to determine whether the focus positions are within the stereoscopic view possible range; and a focus control device configured to cause the first focus lens and the second focus lens to focus on one focus position of the first focus position and the second focus position, said one focus position determined to be within the stereoscopic view possible range, wherein the focus position determination device determines whether the focus positions are between an intersection of the optical axes of the imaging optical systems and a near point of the stereoscopic view possible range, and the focus control device causes the first focus lens and the second focus lens to focus on one of the first focus position and the second focus position determined to be between the intersection and the near point of the stereoscopic view possible range, and wherein the focus control device causes the first focus lens and the second focus lens to focus on one of the first focus position and the second focus position closest to the near point if both the first focus position and the second focus position are between the intersection and the near point of the stereoscopic view possible range.

11. A stereoscopic imaging method using: a first imaging device configured to include a first imaging optical system with a first focus lens and to image a subject to generate a first image; a second imaging device configured to include a second imaging optical system with a second focus lens and to image the subject to generate a second image; and a lens driving device configured to move the first and second focus lenses along a first optical axis of the first imaging optical system and a second optical axis of the second imaging optical system, respectively, the stereoscopic imaging method comprising:

a focus position detection step of moving the focus lenses by the lens driving device to detect a first focus position in an imaging space of the first focus lens and a second focus position in an imaging space of the second focus lens;

a stereoscopic view possible range calculation step of calculating a stereoscopic view possible range where a parallax amount of the first imaging device and the second imaging device is within an acceptable range;

a focus position determination step of determining whether the focus positions are within the stereoscopic view possible range; and a focus step of causing the lens driving device to focus the first focus lens and the second focus lens on one focus position of the first focus position and the second focus position without adjusting a convergence angle formed by the first and second optical axes when the first focus position and the second focus position are different from each other, said one focus position determined to be within the stereoscopic view possible range.

12. A stereoscopic imaging method using: a first imaging device configured to include a first imaging optical system with a first focus lens and to image a subject to generate a first image; a second imaging device configured to include a second imaging optical system with a second focus lens and to image the subject to generate a second image; and a lens driving device configured to move the first and second focus lenses along a first optical axis of the first imaging optical system and a second optical axis of the second imaging optical system, respectively, the stereoscopic imaging method comprising:

a focus position detection step of moving the focus lenses by the lens driving device to detect a first focus position in an imaging space of the first focus lens and a second focus position in an imaging space of the second focus lens;

a field depth calculation step of calculating depths of field of the imaging devices;

a focus position determination step of determining whether both the first focus position and the second focus position are included in the depths of field of the imaging devices; and a focus step of causing the lens driving device to focus the first focus lens and the second focus lens on one of the focus positions detected by the imaging device without adjusting a convergence angle formed by the first and second optical axes when the first focus position and the second focus position are different from each other, the depth of field of which includes both the first focus position and the second focus position.

13. A stereoscopic imaging method using: a first imaging device configured to include a first imaging optical system with a first focus lens and to image a subject to generate a first image; a second imaging device configured to include a second imaging optical system with a second focus lens and to image the subject to generate a second image; and a lens driving device configured to move the first and second focus lenses along a first optical axis of the first imaging optical system and a second optical axis of the second imaging optical system, respectively, the stereoscopic imaging method comprising:

a focus position detection step of moving the focus lenses by the lens driving device to detect a first focus position in an imaging space of the first focus lens and a second focus position in an imaging space of the second focus lens;

a parallax amount calculation step of calculating a parallax amount of the first imaging device and the second imaging device for each of the focus positions;

a focus position determination step of determining the focus position with the smaller parallax amount from among the first focus position and the second focus position; and a focus step of causing the lens driving device to focus the first focus lens and the second focus lens on the focus position determined at the focus position determination step to have the smaller parallax amount without adjusting a convergence angle formed by the first and second optical axes when the first focus position and the second focus position are different from each other.

14. A stereoscopic imaging method using: a first imaging device configured to include a first imaging optical system with a first focus lens and to image a subject to generate a first image; a second imaging device configured to include a second imaging optical system with a second focus lens and to image the subject to generate a second image; and a lens driving device configured to move the first and second focus lenses along a first optical axis of the first imaging optical system and a second optical axis of the second imaging optical system, respectively, the stereoscopic imaging method comprising:

a focus position detection step of moving the focus lenses by the lens driving device to detect a first focus position in an imaging space of the first focus lens and a second focus position in an imaging space of the second focus lens;

a stereoscopic view possible range calculation step of calculating a stereoscopic view possible range in the imaging space where a parallax amount of the first imaging device and the second imaging device is within an acceptable range;

a field depth calculation step of calculating depths of field of the imaging devices;

a parallax amount calculation step of calculating a parallax amount of the first imaging device and the second imaging device for each of the focus positions;

a focus position selection step of selecting one focus position from among the first focus position and the second focus position based on the first focus position, the second focus position, the stereoscopic view possible range, the depths of field, and the parallax amounts; and a focus step of causing the lens driving device to focus the first focus lens and the second focus lens on the selected focus position without adjusting a convergence angle formed by the first and second optical axes when the first focus position and the second focus position are different from each other.

15. A stereoscopic imaging method using: a first imaging device configured to include a first imaging optical system with a first focus lens and to image a subject to generate a first image; a second imaging device configured to include a second imaging optical system with a second focus lens and to image the subject to generate a second image; and a lens driving device configured to move the first and second focus lenses along a first optical axis of the first imaging optical system and a second optical axis of the second imaging optical system, respectively, the stereoscopic imaging method comprising:

a focus position detection step of moving the focus lenses by the lens driving device to detect a first focus position in an imaging space of the first focus lens and a second focus position in an imaging space of the second focus lens;

a stereoscopic view possible range calculation step of calculating a stereoscopic view possible range in the imaging space where a parallax amount of the first imaging device and the second imaging device is within an acceptable range;

a focus position determination step of determining whether the focus positions are between an intersection of the optical axes of the imaging optical systems and a near point of the stereoscopic view possible range; and a focus step of causing the lens driving device to focus the first focus lens and the second focus lens on one focus position of the first focus position and the second focus position without adjusting a convergence angle formed by the first and second optical axes when the first focus position and the second focus position are different from each other, said one focus position determined to be between the intersection and the near point of the stereoscopic view possible range.

* * * * *